(12) United States Patent
Ikari

(10) Patent No.: US 7,973,988 B2
(45) Date of Patent: Jul. 5, 2011

(54) COLOR IMAGE FORMING APPARATUS AND CONTROL METHOD THEREOF

(75) Inventor: Daiki Ikari, Ayase (JP)

(73) Assignee: Canon Kabushiki Kaisha, Tokyo (JP)

( * ) Notice: Subject to any disclaimer, the term of this patent is extended or adjusted under 35 U.S.C. 154(b) by 367 days.

(21) Appl. No.: 12/181,909

(22) Filed: Jul. 29, 2008

(65) Prior Publication Data

US 2009/0033962 A1 Feb. 5, 2009

(30) Foreign Application Priority Data

Jul. 31, 2007 (JP) ................................. 2007-199490

(51) Int. Cl.
*G03F 3/08* (2006.01)
*G06F 15/00* (2006.01)
*G06K 9/00* (2006.01)

(52) U.S. Cl. .......................... 358/518; 358/1.9; 382/167

(58) Field of Classification Search .................... 358/1.9, 358/1.1, 501, 518, 523, 525, 526, 530, 533, 358/536; 382/167, 162; 347/115, 232
See application file for complete search history.

(56) References Cited

U.S. PATENT DOCUMENTS

| | | | | |
|---|---|---|---|---|
| 5,680,168 A * | 10/1997 | Kokubo et al. | ............... | 347/175 |
| 6,118,463 A * | 9/2000 | Houki et al. | .................. | 347/116 |
| 6,324,375 B1 * | 11/2001 | Hada et al. | ..................... | 399/301 |
| 6,330,075 B1 * | 12/2001 | Ishikawa | ........................ | 358/1.9 |
| 6,356,672 B1 * | 3/2002 | Feng et al. | ..................... | 382/312 |
| 6,505,017 B2 * | 1/2003 | Fujii et al. | ....................... | 399/82 |
| 6,994,413 B2 * | 2/2006 | Otsuka et al. | ................... | 347/19 |
| 7,419,238 B2 * | 9/2008 | Yoshida | ........................... | 347/19 |
| 7,542,168 B2 * | 6/2009 | Goma et al. | ................... | 358/1.9 |
| 7,580,647 B2 * | 8/2009 | Komiya | ........................... | 399/49 |
| 7,619,775 B2 * | 11/2009 | Kitamura et al. | .............. | 358/1.9 |
| 7,684,079 B2 * | 3/2010 | Takata et al. | .................... | 358/1.9 |
| 2005/0111759 A1 * | 5/2005 | Perlmutter et al. | ........... | 382/294 |
| 2006/0119895 A1 * | 6/2006 | Takata et al. | ................. | 358/3.26 |
| 2006/0290720 A1 * | 12/2006 | Katsu | .................... | 347/5 |
| 2007/0139664 A1 * | 6/2007 | Kitamura et al. | ............. | 358/1.4 |
| 2007/0258103 A1 * | 11/2007 | Muramatsu | .................... | 358/1.9 |
| 2008/0089609 A1 * | 4/2008 | Perlmutter et al. | ........... | 382/284 |
| 2008/0123145 A1 * | 5/2008 | Kitamura et al. | ............ | 358/3.06 |
| 2008/0136975 A1 * | 6/2008 | Nishida et al. | ................ | 348/744 |
| 2009/0079876 A1 * | 3/2009 | Takeshima et al. | ........... | 348/699 |
| 2010/0220342 A1 * | 9/2010 | Takata et al. | ................... | 358/1.9 |

FOREIGN PATENT DOCUMENTS

JP 20011211316 8/2001

(Continued)

*Primary Examiner* — Madeleine A Nguyen

(74) *Attorney, Agent, or Firm* — Fitzpatrick, Cella, Harper & Scinto

(57) ABSTRACT

In the present invention, an image determination processing unit detects an image characteristic for each pixel in cyan image data of image data subjected to a registration shift correction by one pixel by use of a profile characteristic. Each set of characteristic determination result information A to C is stored in a determination result storing unit, and a decoder determines whether or not to perform a registration shift correction less than one pixel according to the information A to C. For magenta, yellow, or black, an image edge simple determination processing unit and a screen image simple determination processing unit for each color detect the image characteristic for each pixel in a simplified manner. According to this detected characteristic determination result information, it is determined whether or not to perform the registration shift correction less than one pixel for magenta, yellow, or black.

8 Claims, 21 Drawing Sheets

FOREIGN PATENT DOCUMENTS

| | | |
|---|---|---|
| JP | 2002-116394 | 4/2002 |
| JP | 2003-241131 | 8/2003 |
| JP | 2003316088 | 11/2003 |
| JP | 2004-170755 | 6/2004 |
| JP | 2006159452 | 6/2006 |
| JP | 2007168236 | 7/2007 |

* cited by examiner

DIRECTION: UPWARD SHIFT

601

| | | | | | | | | NUMBER OF PIXELS FOR INTERPOLATION: 16 | | | | | | | |
|---|---|---|---|---|---|---|---|---|---|---|---|---|---|---|---|
| W1 | 0 | 0 | 0 | 0 | 0 | 0 | 0 | 0 | 0 | 0 | 0 | 0 | 0 | 0 | 0 | 0 |
| W2 | 33 | 31 | 29 | 27 | 25 | 23 | 21 | 19 | 17 | 15 | 13 | 11 | 9 | 7 | 5 | 3 |
| W3 | 3 | 5 | 7 | 9 | 11 | 13 | 15 | 17 | 19 | 21 | 23 | 25 | 27 | 29 | 31 | 33 |

602

| | | | | | | | | NUMBER OF PIXELS FOR INTERPOLATION: 16 | | | | | | | |
|---|---|---|---|---|---|---|---|---|---|---|---|---|---|---|---|
| W1 | 0 | 0 | 0 | 0 | 0 | 0 | 0 | 0 | 0 | 0 | 0 | 0 | 0 | 0 | 0 | 0 |
| W2 | 9 | 9 | 8 | 8 | 7 | 7 | 6 | 5 | 5 | 4 | 3 | 3 | 2 | 2 | 1 | 1 |
| W3 | 1 | 1 | 2 | 2 | 3 | 3 | 4 | 5 | 5 | 6 | 7 | 7 | 8 | 8 | 9 | 9 |

DIRECTION: DOWNWARD SHIFT

603

| | | | | | | | | NUMBER OF PIXELS FOR INTERPOLATION: 16 | | | | | | | |
|---|---|---|---|---|---|---|---|---|---|---|---|---|---|---|---|
| W1 | 3 | 5 | 7 | 9 | 11 | 13 | 15 | 17 | 19 | 21 | 23 | 25 | 27 | 29 | 31 | 33 |
| W2 | 33 | 31 | 29 | 27 | 25 | 23 | 21 | 19 | 17 | 15 | 13 | 11 | 9 | 7 | 5 | 3 |
| W3 | 0 | 0 | 0 | 0 | 0 | 0 | 0 | 0 | 0 | 0 | 0 | 0 | 0 | 0 | 0 | 0 |

604

| | | | | | | | | NUMBER OF PIXELS FOR INTERPOLATION: 16 | | | | | | | |
|---|---|---|---|---|---|---|---|---|---|---|---|---|---|---|---|
| W1 | 1 | 1 | 2 | 2 | 3 | 3 | 4 | 5 | 5 | 6 | 7 | 7 | 8 | 8 | 9 | 9 |
| W2 | 9 | 9 | 8 | 8 | 7 | 7 | 6 | 5 | 5 | 4 | 3 | 3 | 2 | 2 | 1 | 1 |
| W3 | 0 | 0 | 0 | 0 | 0 | 0 | 0 | 0 | 0 | 0 | 0 | 0 | 0 | 0 | 0 | 0 |

FIG.6

| SCREEN IMAGE? | IMAGE EDGE? | INTERPOLATION -ON PATTERN? | INTERPOLATION -OFF PATTERN? | INTERPOLATION DETERMINATION RESULT |
|---|---|---|---|---|
| * | * | Yes | No | INTERPOLATION ON |
| * | * | No | Yes | INTERPOLATION OFF |
| No | * | No | No | INTERPOLATION ON |
| No | No | No | No | INTERPOLATION ON |
| Yes | No | No | No | INTERPOLATION OFF |
| Yes | Yes | No | No | INTERPOLATION ON |

FIG.15

COLOR IMAGE FORMING APPARATUS AND CONTROL METHOD THEREOF

BACKGROUND OF THE INVENTION

1. Field of the Invention

The present invention relates to a color image forming apparatus and a control method thereof, and more particularly, to a color image forming apparatus and a control method thereof that include multiple color developing means and means for sequentially transferring images having multiple colors formed by the respective developing means.

2. Description of the Related Art

Electrophotography is known as an image recording method used in a color image forming apparatus such as a color printer or a color copy machine. The electrophotography method forms a latent image on a photosensitive drum using a laser beam and develops the image with charged color material (hereinafter, referred to as toner). Image recording is performed by transferring and fixing an image of the developed toner onto a transfer paper or media.

There has been an increase recently in the use of a tandem method for color image formation apparatus. The tandem method includes use of developing devices and photosensitive drums for each of the toner colors. Different color images are sequentially transferred onto an image transfer belt or a recording medium, in order to improve the image forming speed of the color image forming apparatus. This type of color image forming apparatus using the tandem method is known to have a plurality of factors that cause registration shifts. Various countermeasures have been proposed for each of the factors.

One of the factors is in-homogeneity or an attachment position shift of a lens in a deflection-scan device and a mount position shift of the deflection-scan device against a main body of the color image forming apparatus. These position shifts cause an inclination or a curve of a scanning line, and the degree of the curve (hereinafter, referred to as profile) is different for each color, thereby causing registration shifts.

The profile has different characteristics among image forming apparatuses, that is, among recording engines, and further among colors. Examples of the profiles are indicated by Reference numerals 1601 to 1604 in FIG. 16. In the profiles 1601 to 1604, the horizontal axis shows a position in a main-scan direction in the image forming apparatus. A line O expressed as a straight line along the main-scan direction shows an ideal characteristic without a curve. Also, line A, line B, line C, and line D expressed by curves show profiles for respective colors. The characteristics for cyan (hereinafter, designated by C), magenta (hereinafter, designated by M), yellow (hereinafter, designated by Y) and black (hereinafter, designated by K) are shown by the lines A, B, C, and D, respectively. The vertical axis shows an amount of shift in a sub-scan direction against the ideal characteristic. As apparent in the drawing, inflection points of the curves are different among the colors depending on the above mentioned factors and these differences appear to be the registration shits in image data after fixing of the toner.

As a countermeasure for these registration shits, Japanese Patent Laid-Open No. 2002-116394 discloses a method which measures the magnitude of a curve in the scanning line in an assembly process of a deflection-scan device using an optical sensor and fixes a lens with adhesive after adjusting the curve of the scanning line by rotating the lens mechanically.

Japanese Patent Laid-Open No. 2003-241131 discloses a method which measures the magnitude of a inclination of the scanning line using an optical sensor in a process mounting a deflection-scan device to a main body of a color image forming apparatus, adjusts the inclination of the scanning line by inclining the deflection-scan device mechanically, and thereby mounts the device to the main body of the color image forming apparatus.

Further, Japanese Patent Laid-Open No. 2004-170755 discloses a method which measures the magnitude of an inclination and curve in a scanning line using an optical sensor, corrects bit map image data so as to compensate the inclination and curve, and forms the corrected image. This method performs the correction electrically by processing the image data and thereby does not need a mechanical adjustment member or an adjustment process during assembly. Accordingly, it is possible to downsize the color image forming apparatus and to cope with the registration shift problem less expensively than the methods disclosed by Japanese Patent Laid-Open No. 2002-116394 and Japanese Patent Laid-Open No. 2003-241131. This electrical registration shift correction is classified into a correction by one pixel and a correction less than one pixel. The correction by one pixel offsets pixels by one pixel in the sub-scan direction according to the amount of correction of the inclination and curve as indicated by Reference numerals 1701 to 1703 in FIG. 17. Note that, in the description hereinafter, a position for the offset is referred to as a scan line changing pointscan line changing point. That is, in the diagram indicated by Reference numeral 1701 in FIG. 17 which shows background art, P1 to P5 correspond to the scan line changing pointscan line changing points.

The correction of less than one pixel (hereinafter, also referred to as interpolation processing) adjusts a gradation value of bit map image data in a preceding pixel or a following pixel in the sub-scan direction, as shown in the diagram indicated by Reference numerals 1801 to 1805 in FIG. 18 which show background art. That is, when the scanning line curves upward in the profile as shown in the diagram indicated by Reference numeral 1701 in FIG. 17 which shows background art, the bit map image data before gradation correction is corrected toward the reverse direction of the profile in the sub-scan direction. By performing the interpolation processing in this manner, it is possible to eliminate an unnatural step caused by the correction by one pixel at the scan line changing pointscan line changing point boundary and to smooth the image.

Additionally, there are two different cases in which this interpolation processing is to be applied and not applied, depending on the kind of image. For, example, it is preferable not to perform the interpolation processing on a pseudo-halftone image (hereinafter, referred to as screen image) using a dither matrix, because there is a possibility that intensity unevenness occurs to degrade image quality. Even for the screen image, the interpolation processing is preferably performed on an edge potion of the image to eliminate a jaggy image. Further, it is preferable to perform the interpolation processing in order to improve visibility of information by smoothing for a repeated pattern of the same design or print (hereinafter, referred to as pattern image), a character, a fine line, or the like, which can be drawn by office document creation software.

In this manner, while the correction by one pixel in the sub-scan direction is effective for reducing the registration shift, there is a case in which a step caused at the scan line changing pointscan line changing point becomes highly visible. A correction less than one pixel in the sub-scan direction, that is, the interpolation processing, is effective to reduce the effect of this step, but there is a case where the interpolation processing is not suitable depending on the kind of image data.

So as not to perform the interpolation processing for the unsuitable case, it is necessary to judge whether or not to perform the interpolation processing in the interpolation process of the conventional art. This judgment requires a determination of the kind of image data. However, there has been a problem that a circuit size is increased by a requirement of a large scale pattern matching processing or the like in this image determination for identifying the kind of image data. That is, the kind (characteristic) of image data should be determined for determining whether or not the interpolation processing is appropriate, that is, whether or not to perform the interpolation processing. For this purpose, a number of items are required to be performed such as screen determination, pattern determination, copy-forgery-inhibited pattern determination, false determination correction, etc., and further, the above plurality of determinations need to be performed on data for each color when the image data is composed of multiple colors. Accordingly, the circuit size becomes very large.

SUMMARY OF THE INVENTION

The present invention has been developed in view of the foregoing problem, and an object thereof is to provide a color image forming apparatus and a control method thereof which can reduce the circuit size in performing the interpolation processing.

According to a first aspect of the present invention, there is provided a color image forming apparatus capable of forming a color image by developing an electrostatic latent image with multiple color toners according to image data of multiple colors, said apparatus comprising: a first storage means for storing a registration shift correction amount for each of the multiple colors; means for performing registration shift corrections by one pixel for each of the image data of multiple colors, according to the registration shift correction amount; a first detection means for detecting image characteristics for each pixel not in the image data of all the multiple colors but in the image data of at least one or more colors among the multiple colors subjected to the registration shift corrections by one pixel, according to the image data of at least one or more colors; a first determination means for determining whether or not to perform registration shift corrections less than one pixel for each pixel regarding the at least one or more colors, according to information about the characteristic detection result by the first detection means; a second storage means for storing information about the characteristic detection result by the first detection means; a second detection means for detecting the image characteristics for each pixel in the image data of colors except for the at least one or more colors among the multiple colors subjected to the registration shift corrections by one pixel, according to the information stored in the second storage means, after the characteristic detection by the first detection means; and a second determination means for determining whether or not to perform the registration shift corrections less than one pixel for each pixel regarding the colors except for the at least one or more colors, according to the characteristic detection result by the second detection means.

According to a second aspect of the present invention, there is provided a color image forming apparatus capable of forming a color image by developing an electrostatic latent image with multiple color toners according to image data of multiple colors, the apparatus comprising: a first storage means for storing a registration shift correction amount for each of the multiple colors; means for performing registration shift corrections by one pixel for each of the image data of multiple colors, according to the registration shift correction amount; a first detection means for detecting image characteristics for each pixel not in the image data of all the multiple colors but in the image data of at least one or more colors among the multiple colors subjected to the registration shift corrections by one pixel, according to the image data of at least one or more colors; a first determination means for determining whether or not to perform registration shift corrections less than one pixel for each pixel regarding the at least one or more colors, according to the characteristic detection result by the first detection means, and outputting information indicating the determination result; a second storage means for storing the information indicating the determination result; a second detection means for detecting the image characteristics for each pixel in the image data of colors except for the at least one or more colors among the multiple colors subjected to the registration shift corrections by one pixel, according to the information stored in the second storage means, after the characteristic detection by the first detection means; and a second determination means for determining whether or not to perform the registration shift corrections less than one pixel for each pixel regarding the colors except for the at least one or more colors, according to the characteristic detection result by the second detection means.

According to a third aspect of the present invention, there is provided a color image forming apparatus capable of forming a color image by developing an electrostatic latent image with multiple color toners according to image data of multiple colors, the apparatus comprising: a first storage means for storing a registration shift correction amount for each of the multiple colors; means for performing registration shift corrections by one pixel for each of the image data of multiple colors, according to the registration shift correction amount; a first detection means for detecting multiple image characteristics for each pixel in the image data of one color in the image data of the multiple colors subjected to the registration shift corrections by one pixel, according to the image data of the one color; means for obtaining information about the characteristic detection result according to the detection result by the first detection means, the means obtaining respective sets of the information about the multiple characteristics; a first determination means for determining whether or not to perform registration shift corrections less than one pixel for the one color, according to the obtained multiple sets of the information corresponding to the multiple characteristics, respectively; a second storage means for storing the multiple sets of the information; a second detection means for detecting the image characteristics for each pixel in the image data of colors except for the one color among the multiple colors subjected to the registration shift corrections by one pixel, according to the multiple sets of the information stored in the second storage means, after the characteristic detection by the first detection means; and a second determination means for determining whether or not to perform the registration shift corrections less than one pixel for each pixel regarding the colors except for the one color, according to the characteristic detection result by the second detection means.

According to a fourth aspect of the present invention, there is provided a control method of a color image forming apparatus capable of forming a color image by developing an electrostatic latent image with multiple color toners according to image data of multiple colors, the control method comprising: a step of correcting a registration shift by one pixel for each of the image data of multiple colors, according to a registration shift correction amount for each of the multiple colors stored in a first storage means; a first detection step of detecting image characteristics for each pixel not in the image data of all the multiple colors but in the image data of at least one or more colors among the multiple colors subjected to the registration shift corrections by one pixel, according to the image data of the at least one or more colors; a storage step of storing information about the characteristic detection result by the first detection step into a second storage means; a first determination step for determining whether or not to perform registration shift corrections less than one pixel for each pixel regarding the at least one or more colors, according to information about the characteristic detection result by the first detection step; a second detection step of detecting the image characteristics for each pixel in the image data of colors except for the at least one or more colors among the multiple colors subjected to the registration shift corrections by one pixel, according to the information stored in the second storage means; and a second determination step for determining whether or not to perform the registration shift corrections less than one pixel for each pixel regarding the colors except for the at least one or more colors, according to the characteristic detection result by the second detection step.

According to a fifth aspect of the present invention, there is provided a control method of a color image forming apparatus capable of forming a color image by developing an electrostatic latent image with multiple color toners according to image data of multiple colors, the control method comprising: a step of correcting a registration shift by one pixel for each of the image data of multiple colors, according to a registration shift correction amount for each of the multiple colors stored in a first storage means; a first detection step of detecting image characteristics for each pixel not in the image data of all the multiple colors but in the image data of at least one or more colors among the multiple colors subjected to the registration shift corrections by one pixel, according to the image data of the at least one or more colors; a first determination step of determining whether or not to perform registration shift corrections less than one pixel for each pixel regarding the at least one or more colors, according to the characteristic detection result by the first detection step, and outputting information about the determination result; a storage step of storing information indicating the determination result into a second storage means; a second detection step of detecting the image characteristics for each pixel in the image data of colors except for the at least one or more colors among the multiple colors subjected to the registration shift corrections by one pixel, according to the information stored in the second storage means; and a second determination step of determining whether or not to perform the registration shift corrections less than one pixel for each pixel regarding the colors except for the at least one or more colors, according to the characteristic detection result by the second detection step.

According to the present invention, it is possible to save an image determination circuit by applying an image determination result of a previously processed color plate to a color plate to be processed subsequently and to reduce the circuit size.

Further features of the present invention will become apparent from the following description of exemplary embodiments (with reference to the attached drawings).

BRIEF DESCRIPTION OF THE DRAWINGS

FIG. 4 is a diagram showing the relationship of FIGS. 4A and 4B;

FIG. 6 is a diagram showing other examples of weighting in the transfer processing according to an embodiment of the present invention;

FIG. 10 is a diagram showing the relationship of FIGS. 10A and 10B;

FIG. 13 is a diagram showing the relationship of FIGS. 13A and 13B;

FIG. 15 is a diagram showing a lineup of determinations by a decoder according to an embodiment of the present invention;

DESCRIPTION OF THE EMBODIMENTS

Figure 1:
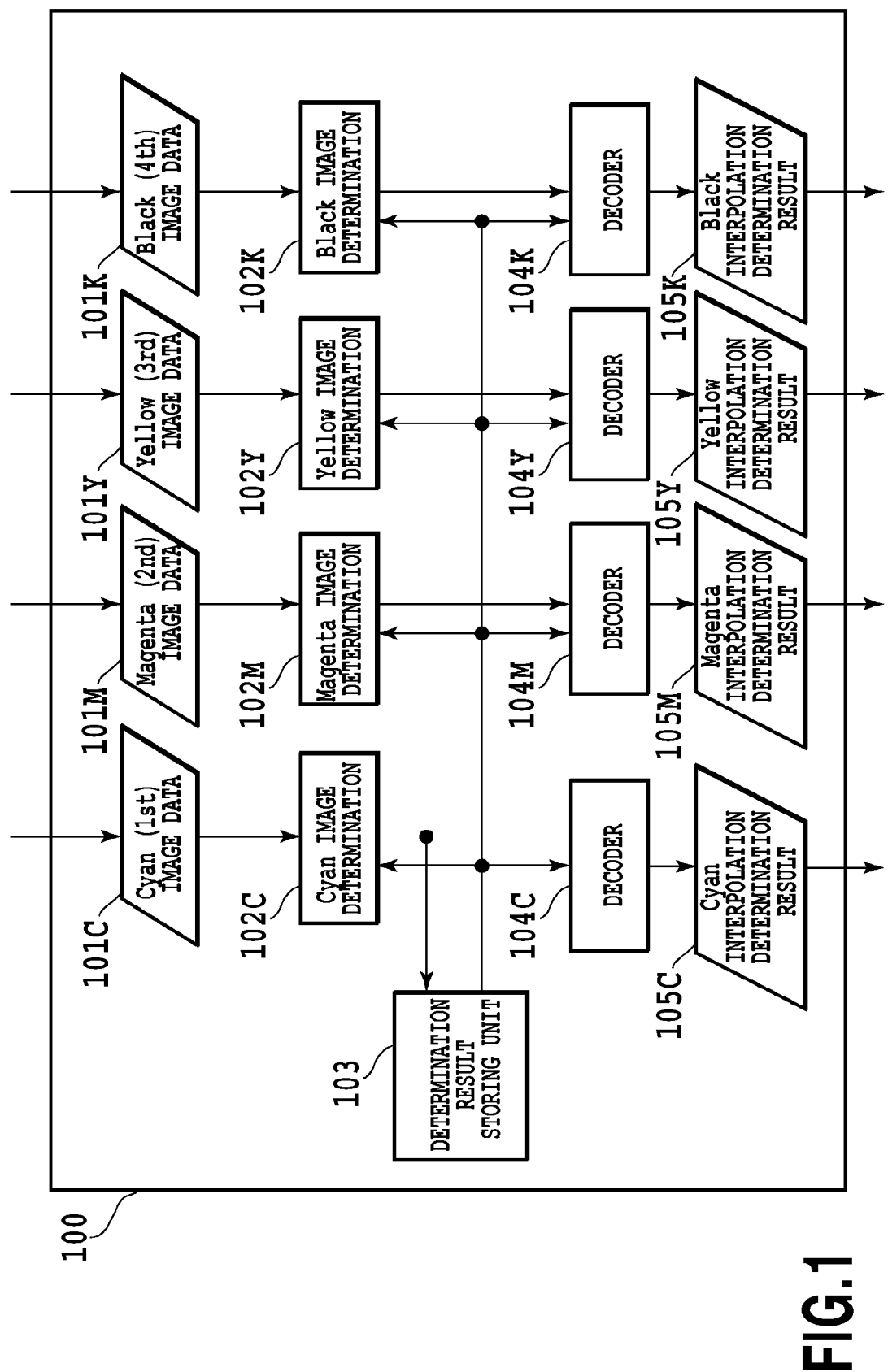
FIG. 1 is a diagram showing an interpolation determination unit according to an embodiment of the present invention.

Hereinafter, embodiments of the present invention will be described with reference to the drawings. Note that elements having the same function are denoted by the same Reference numeral in the drawings to be described hereinafter, and repeated description thereof will be omitted.

First Embodiment

Figure 4A:
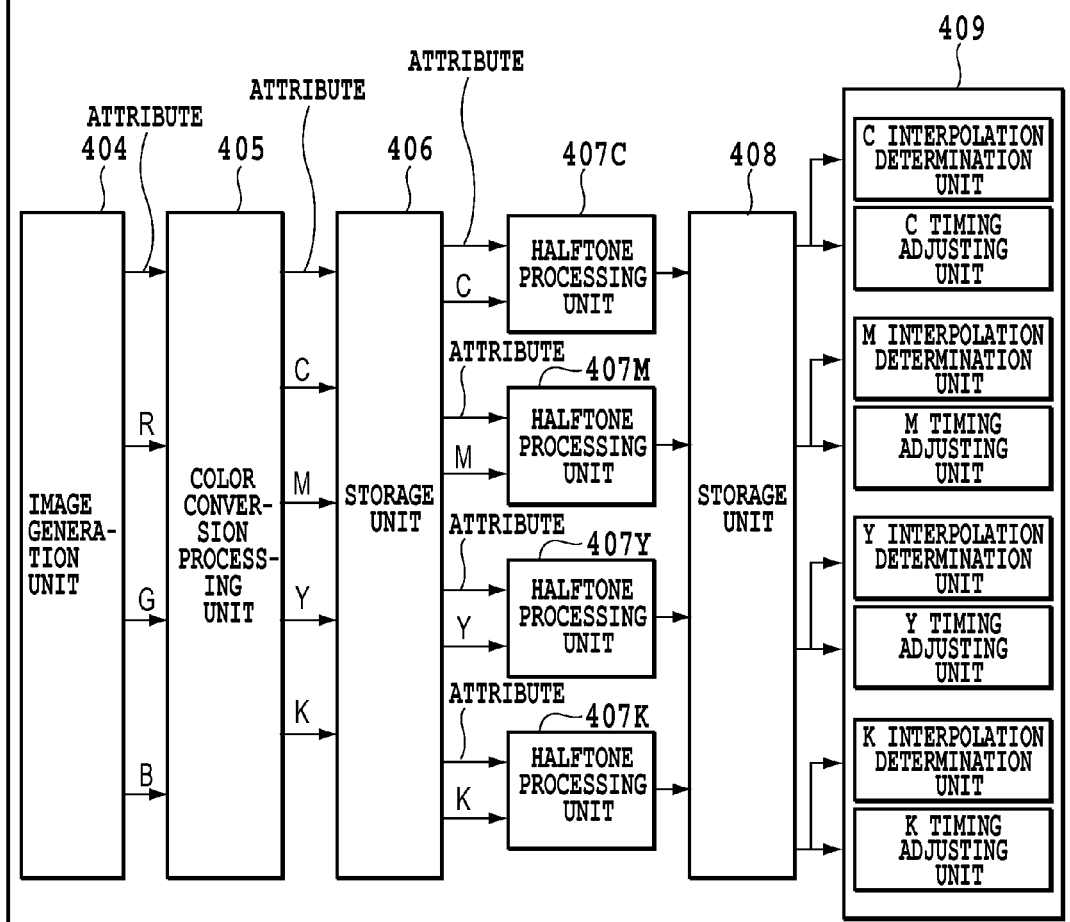
FIGS. 4A and 4B are a block diagram for forming an electrostatic latent image according to an embodiment of the present invention.
Figure 4B:
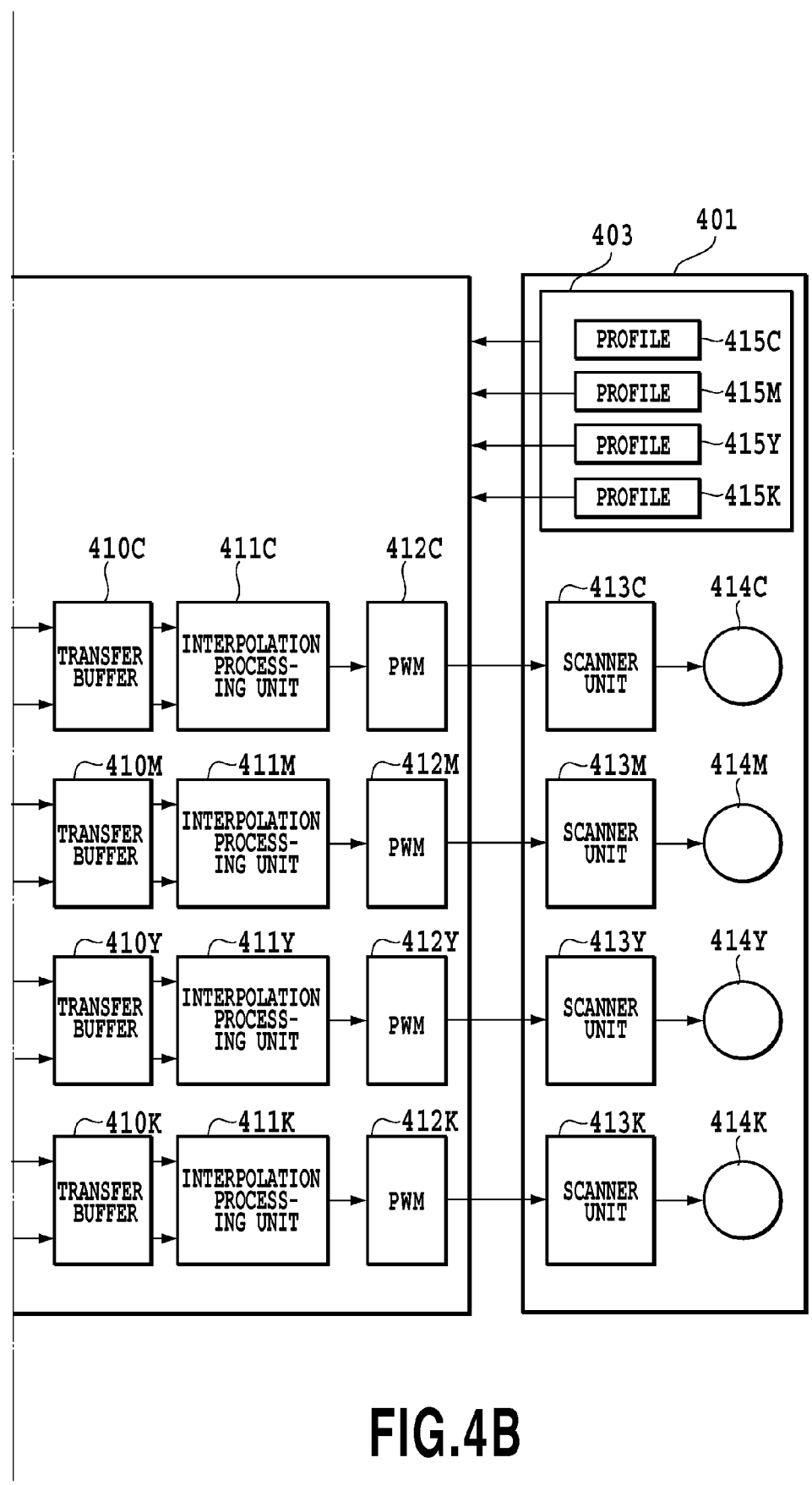

FIGS. 4A and 4B are a diagram for illustrating a configuration of each block for forming an electrostatic latent image in a color image forming apparatus using the electrophotographic method according to a first embodiment.

The color image forming apparatus includes an image forming unit 401 and an image processing unit 402. The image processing unit 402 generates bit map image information and the image forming unit 401 performs image formation onto a recording medium according to the image information.

Figure 2:
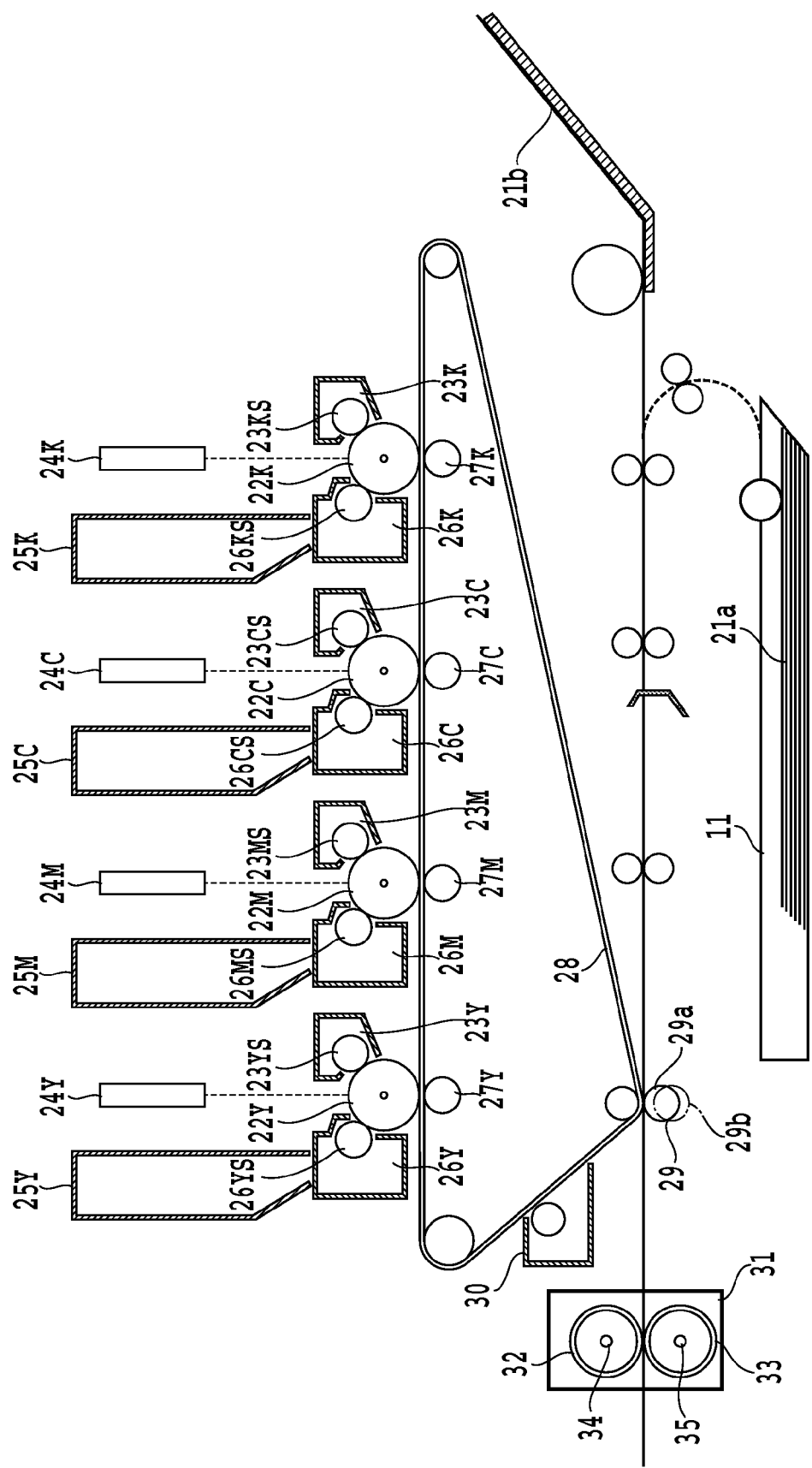
FIG. 2 is a diagram showing a configuration of a color image forming apparatus according to an embodiment of the present invention.

FIG. 2 is a cross section of a tandem type color image forming apparatus employing an intermediate transfer body 28, which is an example of the color image forming apparatus using the electrophotography. With reference to FIG. 2, operation of the image forming unit 401 in the color image forming apparatus using the electrophotography will be described.

The image forming unit 401 activates an exposure operation according to an exposure time processed by the image processing unit 402 to form an electrostatic latent image and develops this electrostatic latent image to form a single-color toner image. The image forming unit 401 forms a multi-color toner image by overlapping these single-color toner images, transfers this multi-color toner image onto a recording medium 11, and fixes the multi-color toner image on the recording medium 11.

A charging means is configured to include four injection electrostatic chargers 23Y, 23M, 23C, and 23K for charging photo-sensitive bodies 22Y, 22M, 22C, and 22K for respective colors Y, M, C, and K, and the injection chargers include sleeves 23YS, 23MS, 23CS, and 23KS, respectively.

The photosensitive bodies 22Y, 22M, 22C, and 22K are rotated by a transfer driving force of a drive motor (not shown in the drawing), and the drive motor rotates the photosensitive bodies 22Y, 22M, 22C, and 22K counter-clockwise according to the image forming operation. Exposure means irradiate the photosensitive bodies 22Y, 22M, 22C, and 22K with exposure light from scanner units 24Y, 24M, 24C, and 24K to selectively expose the surfaces of the photosensitive bodies 22Y, 22M, 22C, and 22K according to multiple color (Y, M, C, and K) image data. Thereby, the image forming unit 401 is configured to form an electrostatic latent image.

A developing means is configured to include four development devices 26Y, 26M, 26C, and 26K which perform development for respective colors of Y, M, C, and K for visualizing the above electrostatic latent image, and the development devices include sleeves 26YS, 26MS, 26CS, and 26KS, respectively. That is, the developing means is a means for developing the electrostatic latent image formed on the photosensitive body and forming a single color toner image on the photosensitive body. Further, for forming an image including multiple colors, the developing means is provided for each of the above multiple colors. Thereby, it is possible to develop the electrostatic latent images with multiple color toners and to form a color image. Note that each of the development devices 26 is detachable.

A transfer means transfers a single color toner image from the photosensitive body 22 to the intermediate transfer body 28. That is, the transfer means is a means for sequentially transferring the multiple color images developed by respective developing means onto a medium such as the intermediate transfer body. In the present embodiment, the intermediate transfer body 28 is rotated clockwise and the single color toner images are transferred according to the rotation of the photosensitive bodies 22Y, 22M, 22C, and 22K and the first transfer rollers 27Y, 27M, 27C, and 27K which are disposed on the opposite side of the photosensitive bodies, respectively. By applying an appropriate bias voltage to the first transfer roller 27 and differentiating a rotation speed between the photosensitive body 22 and the intermediate transfer body 28, it is possible to transfer the single color toner image effectively onto the intermediate transfer body 28. This processing is referred to as the first transferring.

Note that, while a medium, to which the image formed on the photosensitive body is transferred, is the intermediate transfer body in the present embodiment, the medium is not limited to the intermediate transfer body. For, example, when the intermediate transfer body is not used, the image formed on the photosensitive body is transferred directly onto a recording medium. In this case, the above medium is a recording medium. That is, in the present invention, the "medium to which an image formed on the photosensitive body is transferred" is a member or material to which an image such as a toner image formed on the photosensitive body is transferred, and the intermediate transfer body, the recording medium, or the like is selected therefor depending on a configuration of the apparatus.

In the present specification, the "intermediate transfer body" is a member for temporarily retaining an image formed on the photosensitive body before the image is transferred to a recording medium.

Also, in the present specification, the "recording medium" is not only a paper used in a general recording apparatus but also a wide range of material such as cloth, plastic film, etc. which can form an image by receiving color material such as toner or the like.

Further, the transfer means overlaps the single color toner images on the intermediate transfer body 28 at respective stations and carries the overlapped multi-color toner image to the second transfer roller 29 by the rotation of the intermediate transfer body 28. Then, the recording medium 11 is sandwiched and carried from a paper feed tray 21 to the second transfer roller 29 and the multi-color toner image on the intermediate transfer body 28 is transferred onto the recording medium 11. The toner image is transferred electrostatically onto the recording medium 11 by applying an appropriate bias voltage to this second transfer roller 29. This processing is referred to as the second transferring. The second transfer roller 29 contacts the recording medium at a position 29a during transferring the multi-color toner image onto the recording medium 11, and separates therefrom to a position 29b after the print processing.

A fixing means includes a fixing roller 32 for heating the recording medium 11 and a press roller 33 for press-contacting the recording medium 11 with the fixing roller 32 in order to melt and fix the multi-color toner image transferred to the recording medium 11 onto the recording medium 11. The fixing roller 32 and the press roller 33 are formed with hollow centers and contain heaters 34 and 35, respectively. A fixing device 31 carries the recording medium 11 holding the multi-color toner image by the fixing roller 32 and the press roller 33 and also applies heat and pressure to fix the toner to the recording medium 11.

After toner fixing, the recording medium 11 is ejected to a paper ejection tray (not shown in the drawing) by an ejection roller (not shown in the drawing) and the image forming operation is completed. A cleaning means 30 cleans the intermediate transfer body 28 to eliminate remaining (residual) toner and the remaining unused toner is stored in a cleaner box after the four-color multi-color toner image formed on the intermediate transfer body 28 has been transferred onto the recording medium 11.

Figure 3:
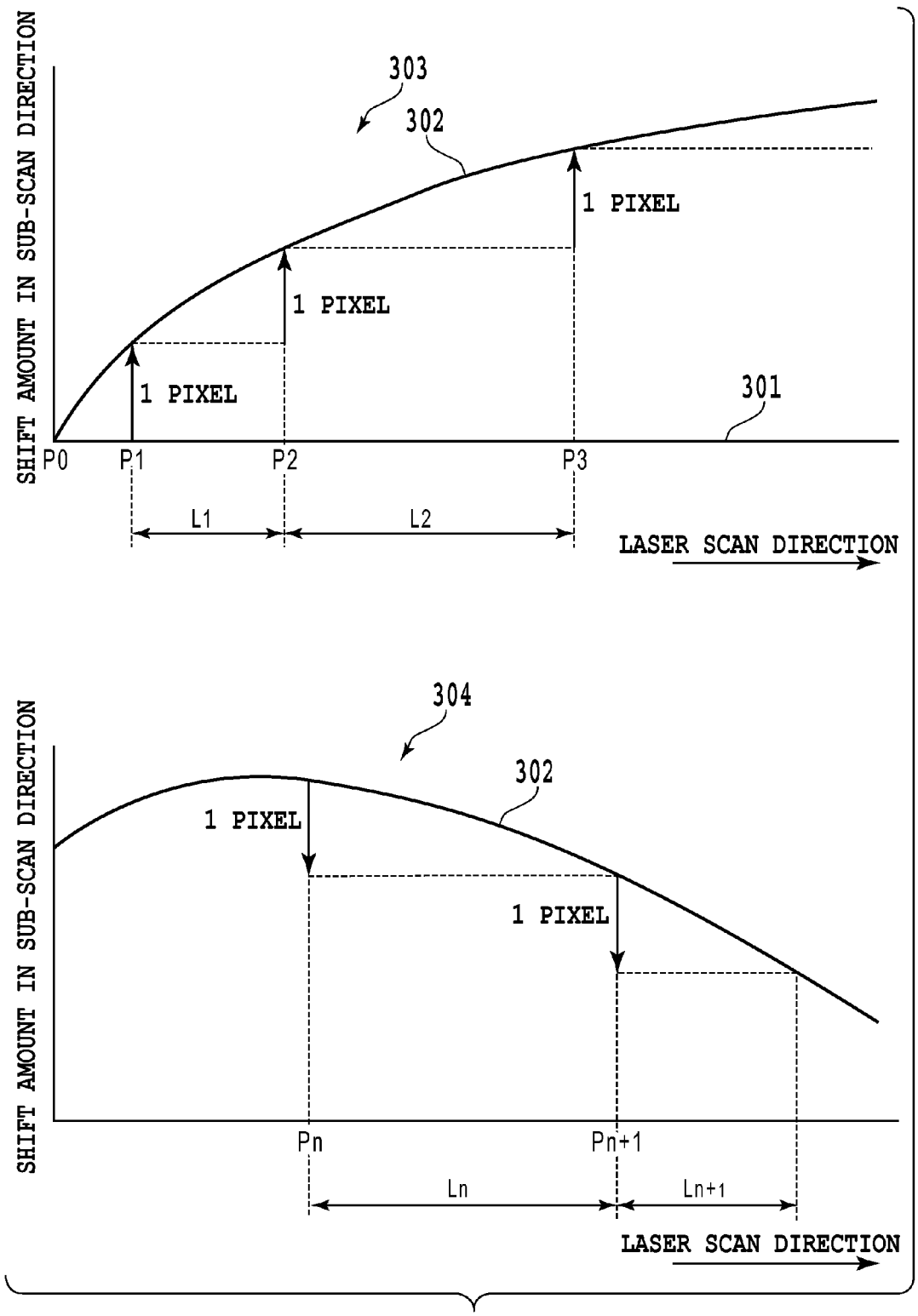
FIG. 3 is a diagram showing a profile characteristic of a scanning line for each color according to an embodiment of the present invention.

The profile characteristic of a scanning line for each color in the image forming apparatus will be described with reference to FIG. 3. Reference numeral 303 indicates a diagram showing a region where the profile characteristic of the image forming apparatus shifts upward from the laser scan direction. Also, Reference numeral 304 indicates a diagram showing a region where the profile characteristic of the image forming apparatus shifts downward from the laser scan direction. Reference numeral 301 indicates an ideal scanning line and shows a characteristic which is obtained when the scan is performed perpendicular to the rotation direction of the photosensitive body 22.

Note that, in the present specification, the "profile characteristic" is information about registration shift correction amount for correcting the registration shift generated according to the curve characteristic (profile). That is, the profile characteristic shows how much amount of the registration shift in the sub-scan direction to be corrected in a predetermined line in the laser scan direction. Thereby, the registration shift correction amount can be generated for each pixel by computation so as to cancel the registration shift caused by the curve characteristic. A direction of the registration shift correction amount of each pixel may be set to a direction to be corrected against the curve characteristic or may be set to the same direction as that of the curve characteristic, as described hereinafter.

Also, in the present specification, the "curve characteristic" is specific to an image forming means of each color in the image forming apparatus capable of forming an image composed of multiple colors and expresses the registration shift amount of each pixel along the laser scan direction.

Further, in the present specification, the "registration shift amount" indicates a shift amount in the sub-scan direction for each pixel in a predetermined line along the laser scan direction from a target position to be originally irradiated by the laser.

Figure 7:
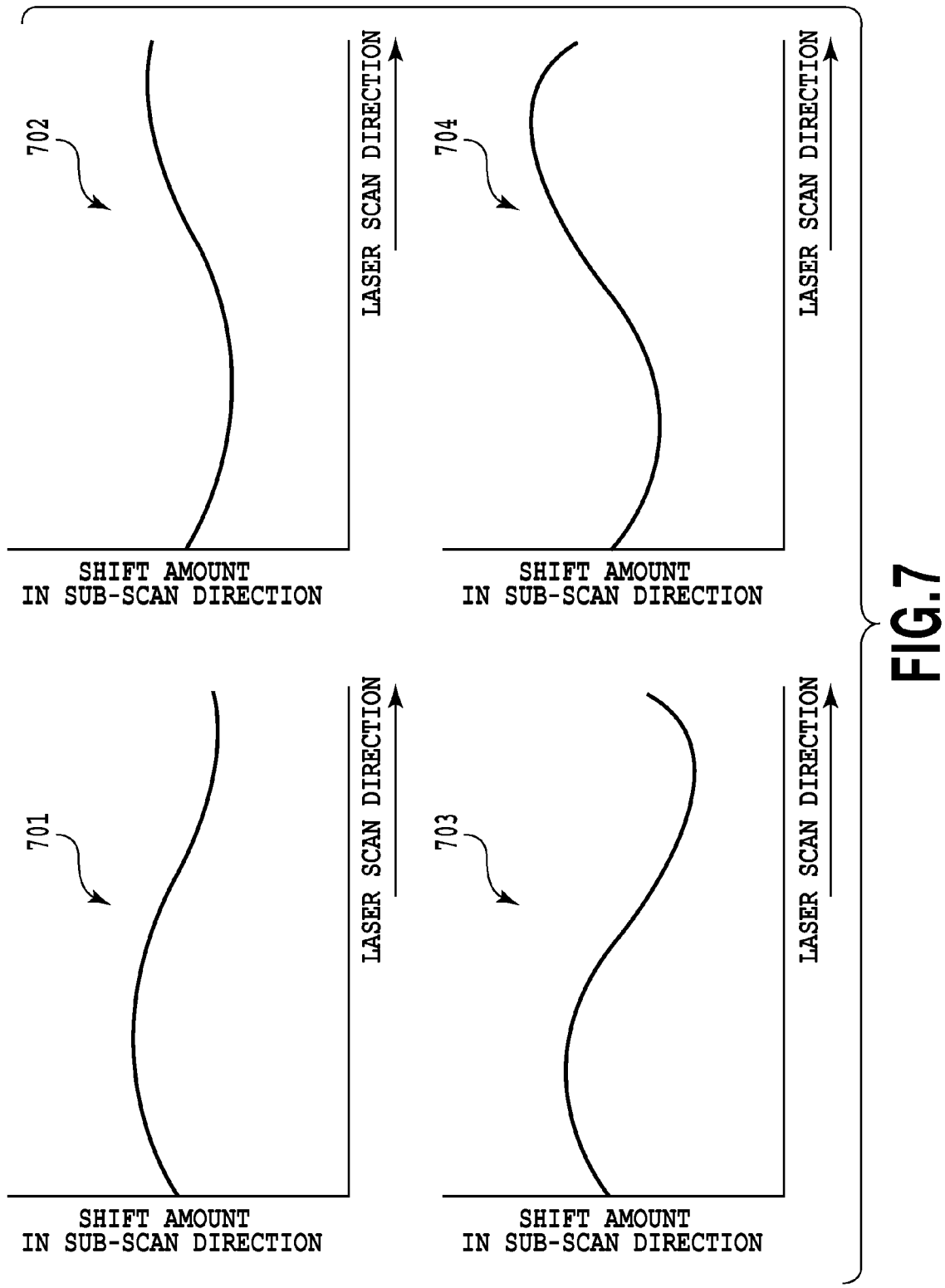
FIG. 7 is a diagram showing a relationship between a shift direction and a correction direction according to an embodiment of the present invention.

Note that, in the description hereinafter, it will be assumed that the profile characteristic is defined in a direction in which the correction is to be performed in the image processing unit 402, but the definition of the profile characteristic is not limited to this assumption. That is, by defining the profile characteristic in a shift direction specific to the image forming unit 401, the image processing unit 402 may be configured to perform a correction having the reverse characteristic thereof. FIG. 7 shows relationships between diagrams showing a direction to which the correction is to be performed by the image processing unit 402 and diagrams showing a shift direction of the image forming unit 401, depending on the profile definitions. When the profile characteristic is defined to be in a direction to which the correction is to be performed by the image processing unit 402 as shown in the diagram indicated by Reference numeral 701, the curve characteristic of the image forming unit 401 has the reverse feature such as shown in the diagram indicated by Reference numeral 702. On the other hand, when the curve characteristic of the image forming unit 401 is defined to be the profile characteristic as shown in the diagram indicated by Reference numeral 703, a direction to which the correction is to be performed in the image processing unit 402 becomes the direction shown in the diagram indicated by Reference numeral 704.

Figure 9:
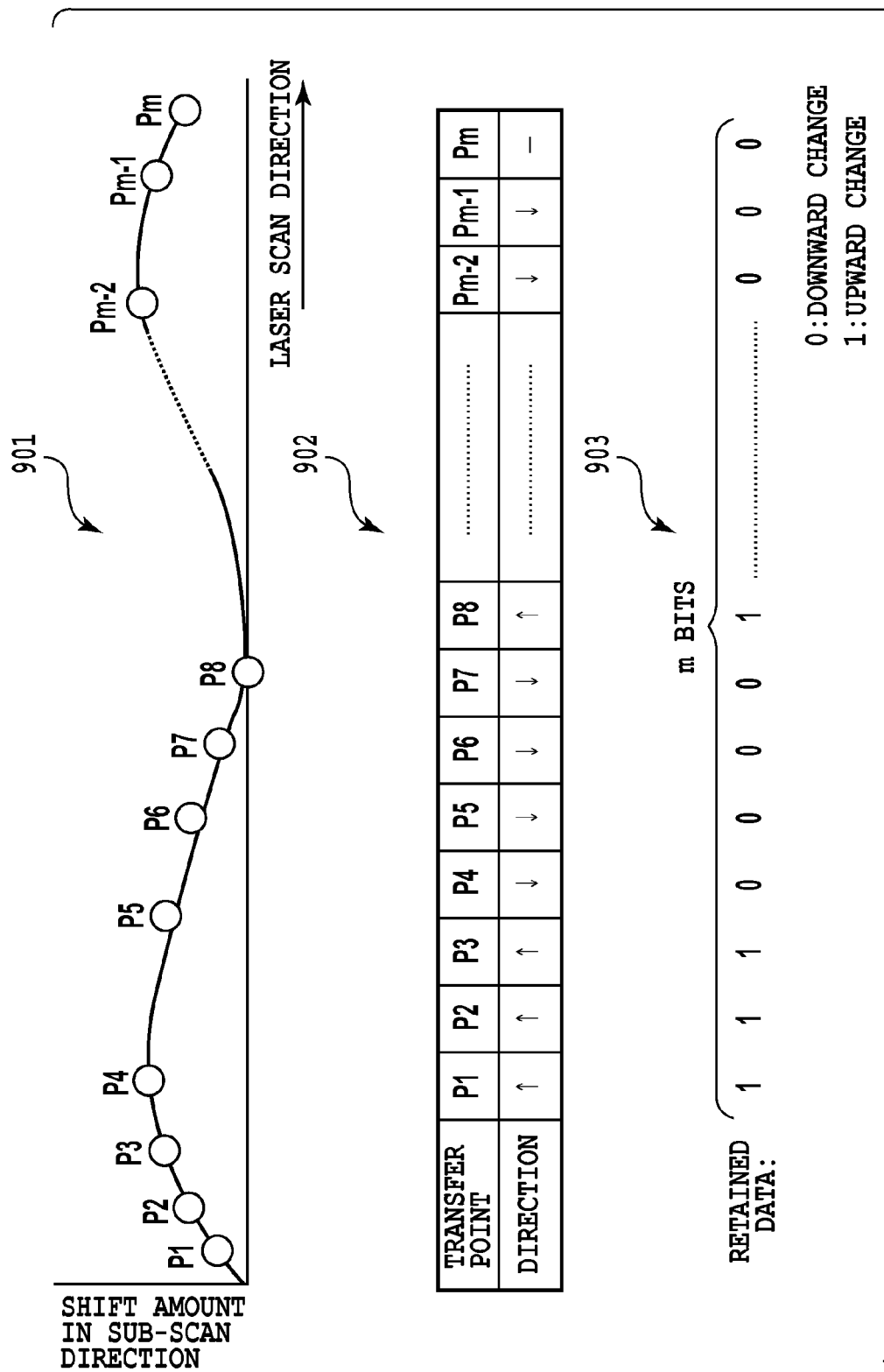
FIG. 9 is a diagram for illustrating a retaining method of the profile characteristic data according to an embodiment of the present invention.

Also, for retaining the profile characteristic data, a pixel position of the scan line changing pointscan line changing point in the main-scan direction and a direction of a change to the next scan line changing pointscan line changing point are retained as shown in FIG. 9, for example. Specifically, in the example shown in FIG. 9, the scan line changing pointscan line changing points P1, P2, P3 . . . Pm are defined for a profile characteristic indicated by Reference numeral 901. The scan line changing pointscan line changing point is defined as a point where a shift by one pixel is caused in the sub-scan direction, and there are two cases for the direction; upward change and downward change to the next scan line changing pointscan line changing point. Each coordinate of the scan line changing pointscan line changing point defined in this manner is associated with the corresponding scan line changing pointscan line changing point and stored in a storage means such as a RAM.

For example, the scan line changing pointscan line changing point P2 is a point where an upward transfer is to be performed up to the next scan line changing pointscan line changing point P3. Therefore, the scan line changing direction at P2 is upward (↑) as shown in the diagram indicated by Reference numeral 902. Similarly, also at the scan line changing pointscan line changing point P3, the scan line changing direction is upward (↑) up to the next scan line changing pointscan line changing point P4. The scan line changing direction at the scan line changing pointscan line changing point P4 is different from the directions at the previous points and becomes downward (↓). For retaining this direction data, the upward direction data is denoted by "1" and the downward direction data is denoted by "0" as shown in the diagram indicated by Reference numeral 903, for example. In this case, the number of the data to be retained is the same as that of the scan line changing pointscan line changing points and, when the number of the scan line changing pointscan line changing points is m, the number of bits to be retained becomes m.

Reference numeral 302 indicates actual scanning lines having inclinations and curves caused by a positional inaccuracy or a diameter shift of the photosensitive body 22 and a positional inaccuracy of an optical system in the scanner unit 24 (24C, 24M, 24Y, or 24K) for each color shown in FIG. 2. In the image forming apparatus, this profile characteristic is different among recording devices thereof (recording engines), and further, the profile characteristic is different among colors in the color image forming apparatus.

Using the profile characteristic 303, the scan line changing pointscan line changing point in the region where the profile characteristic shifts upward from the laser scan direction will be described.

In the present invention, the scan line changing point means a point having a shift by one pixel in the sub-scan direction. That is, in the profile characteristic 303, the point P1, P2, or P3 which has a shift by one pixel in the sub-scan direction on the upward curve characteristic 302 corresponds to the scan line changing point. Here, the profile characteristic 303 is expressed on the basis of P0. As apparent in the drawing, a distance between the scan line changing points (L1 or L2) becomes shorter in a region where the curve characteristic 302 has a sharp change and becomes longer in a region of a gradual change thereof.

Next, using the profile characteristic 304, the scan line changing point in the region where the profile characteristic shifts downward from the laser scan direction will be described. Also in the region where the profile characteristic shifts downward, the scan line changing point is defined to be a point of a shift by one pixel in the sub-scan direction. That is, in the profile characteristic 304, the point Pn or Pn+1 which has a shift by one pixel in the sub-scan direction on the downward curve characteristic 302 corresponds to the scan line changing point. Also in the profile characteristic 304, similarly to the profile characteristic 303, the distance between the scan line changing points (Ln or Ln+1) becomes shorter in a region where the curve characteristic 302 has a sharp change, and becomes longer in a region of a gradual change thereof.

In this manner, the scan line changing point is closely related with the degree of change in the curve characteristic 302 specific to the image forming apparatus. Therefore, the number of the scan line changing points increases in the image forming apparatus having a sharp curve characteristic and, on the other hand, the number of the scan line changing points decreases in the image forming apparatus having a gradual curve characteristic.

As already described, the curve characteristic of the image forming apparatus is different also among colors and the number and position of the scan line changing points are different among colors. The differences among colors appear in an image composed of all color toner images transferred onto the intermediate transfer body 28 as registration shifts. The present embodiment relates to the processing at this scan line changing point and details thereof will be described hereinafter with reference to other drawings.

Next, processing of the image processing unit 402 in the color image forming apparatus will be described with reference to FIGS. 4A and 4B.

Figure 11:
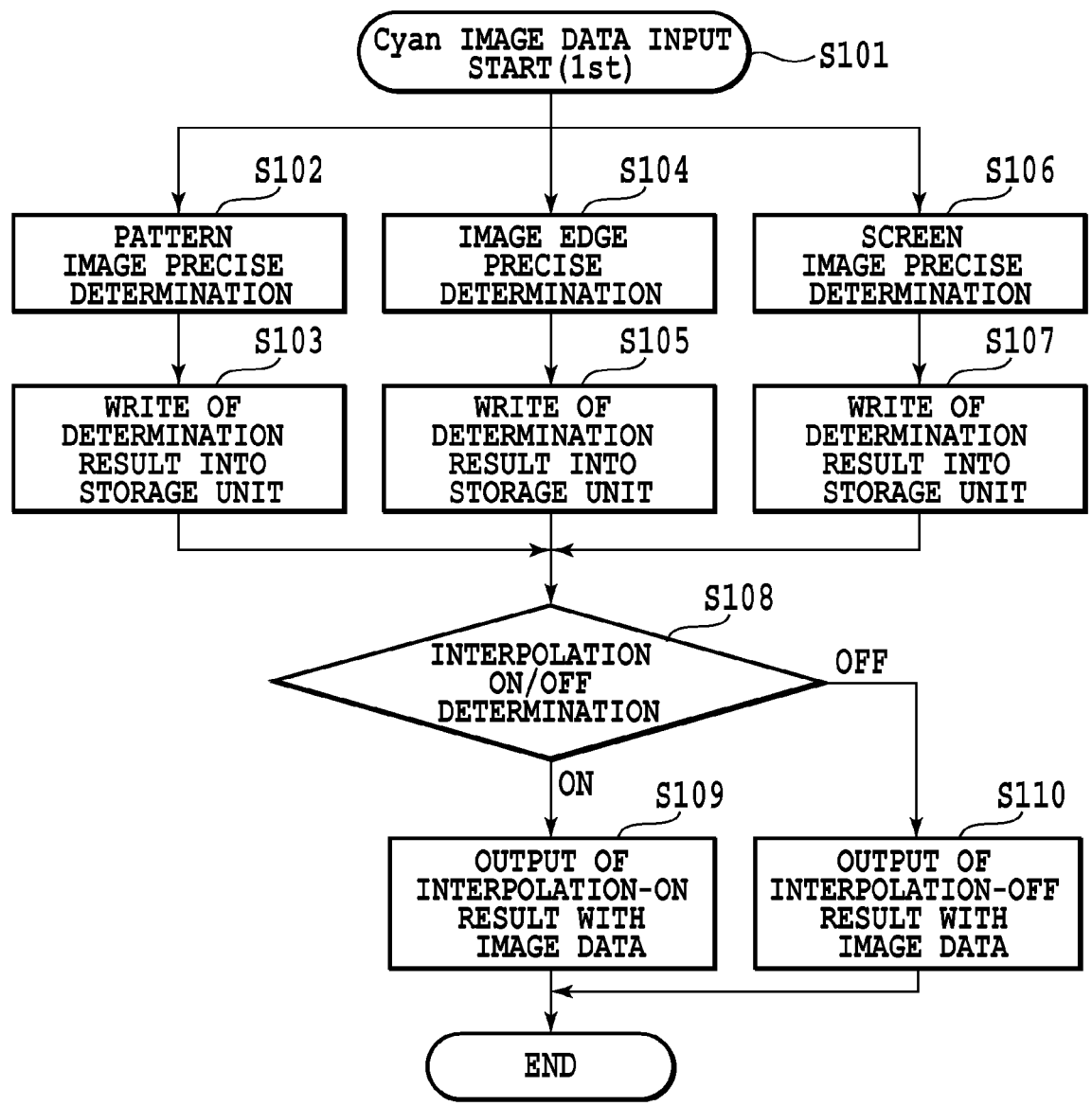
FIG. 11 is a flowchart showing preceding processing in the interpolation determination unit according to an embodiment of the present invention.
Figure 12:
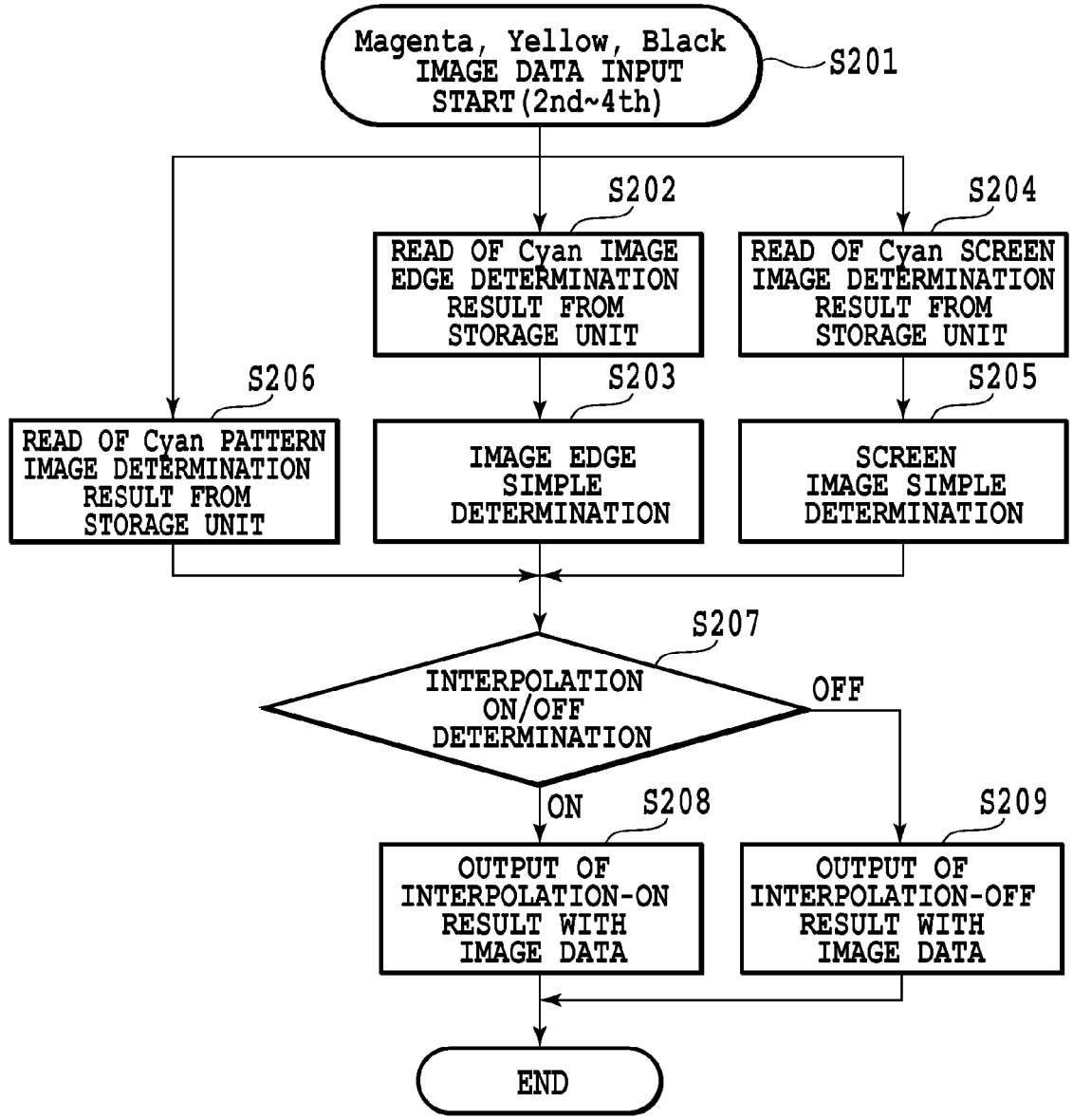
FIG. 12 is a flowchart showing the following processing in the interpolation determination unit according to an embodiment of the present invention.
Figure 14:
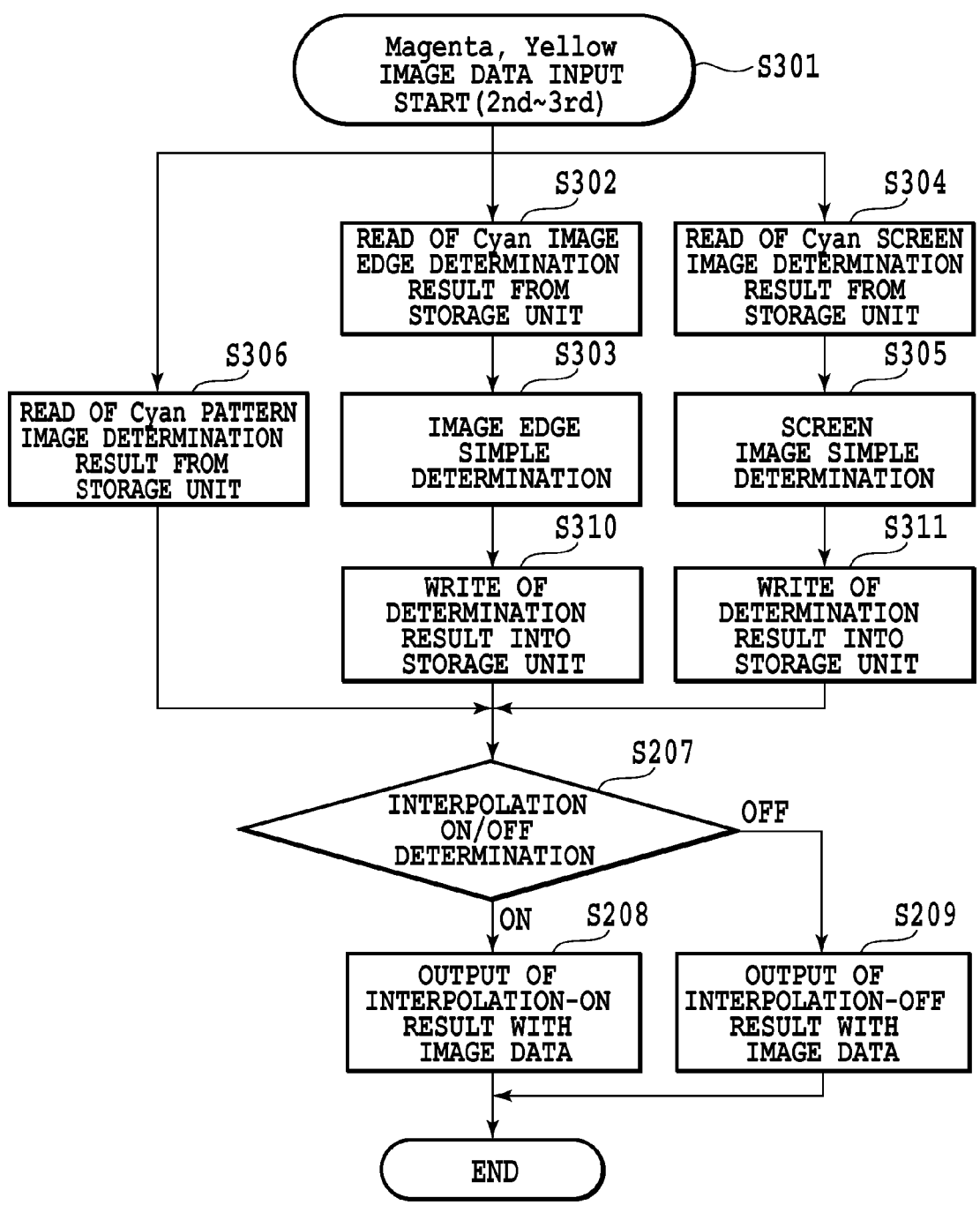
FIG. 14 is a flowchart showing processing in the interpolation determination unit according to an embodiment of the present invention.
Figure 16:
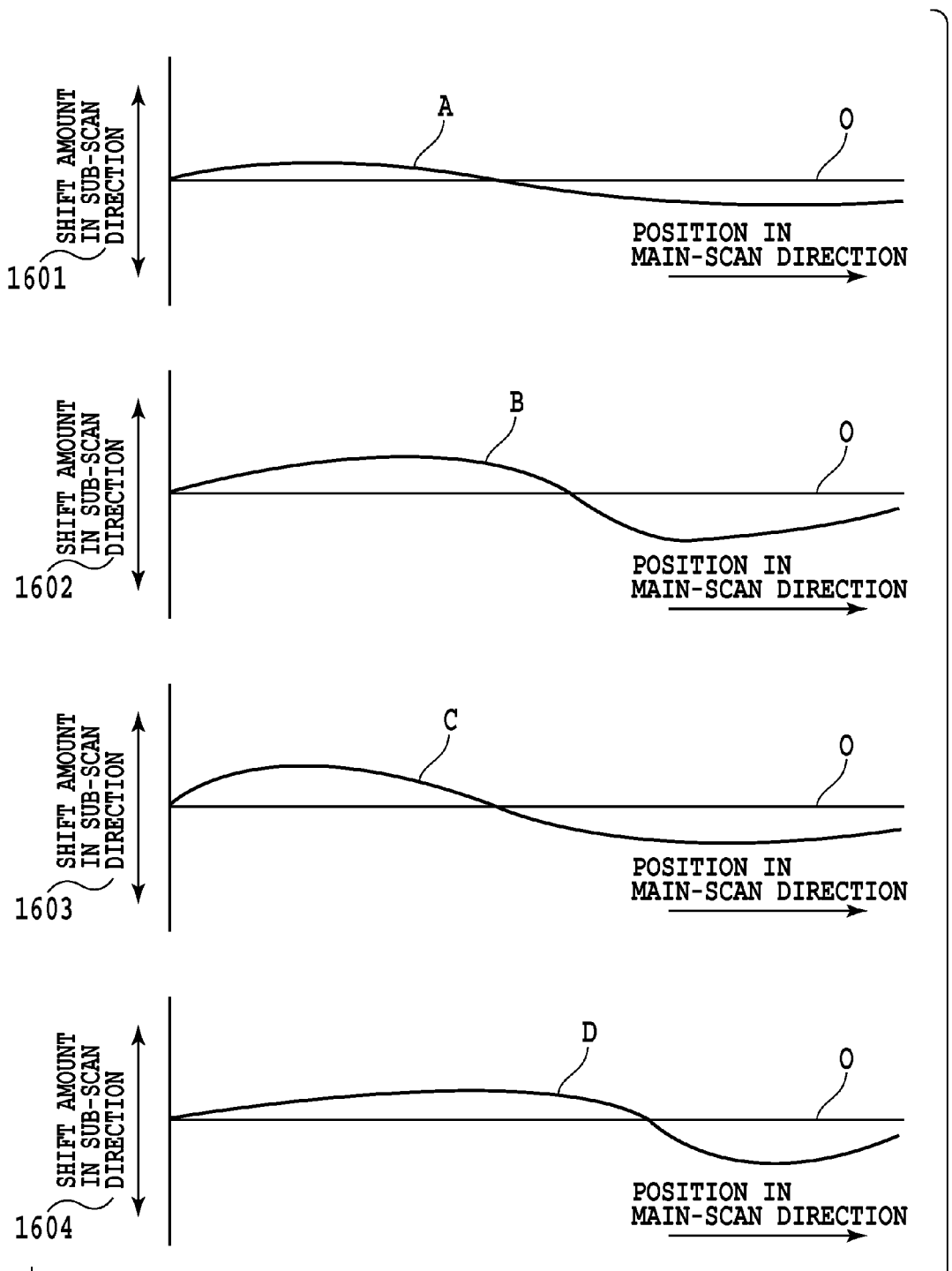
FIG. 16 is a diagram showing a curve or an inclination of a scanning line on a conventional photosensitive drum.
Figure 17:
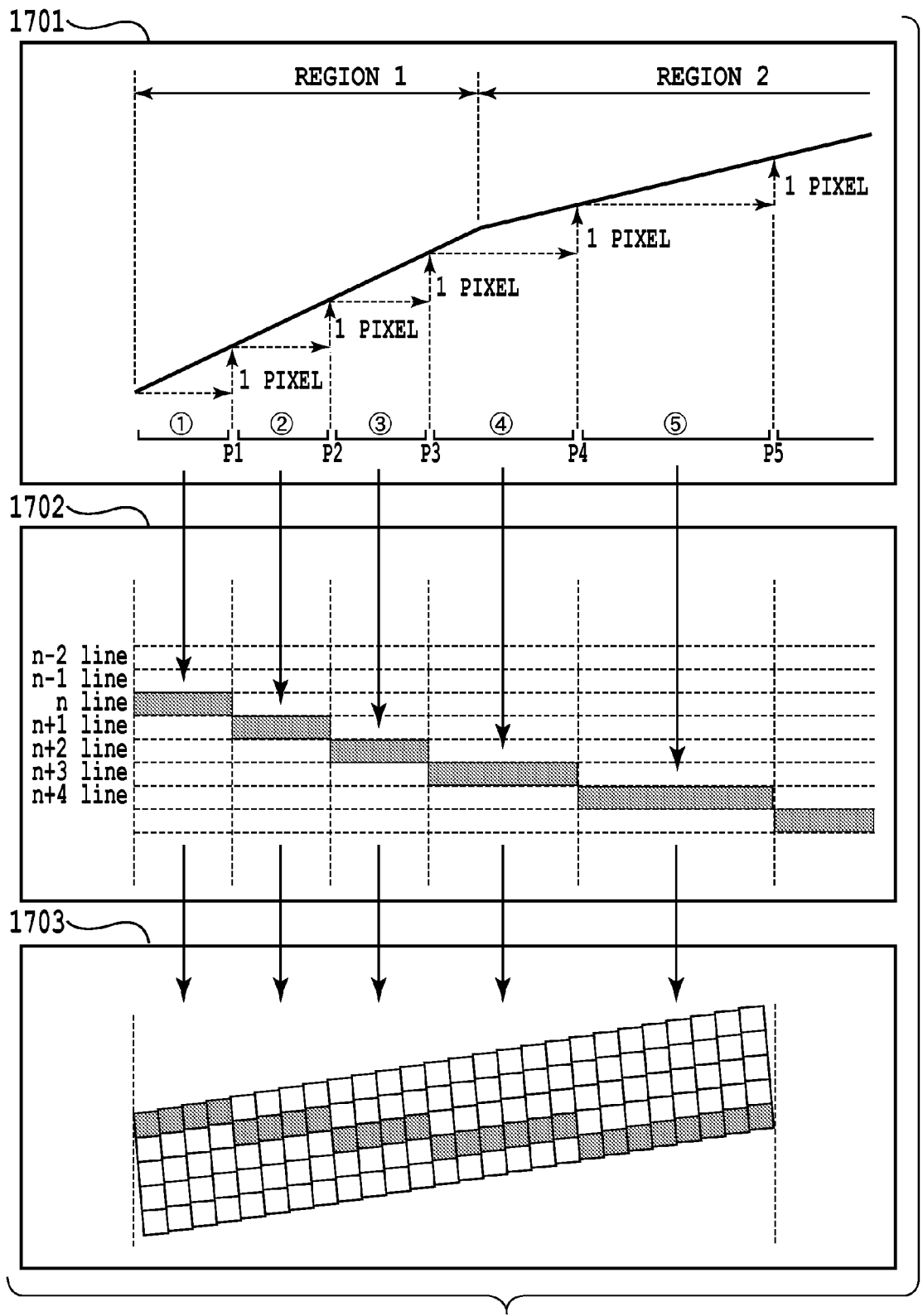
FIG. 17 is a diagram showing a registration shift correction by one pixel in a conventional art.
Figure 18:
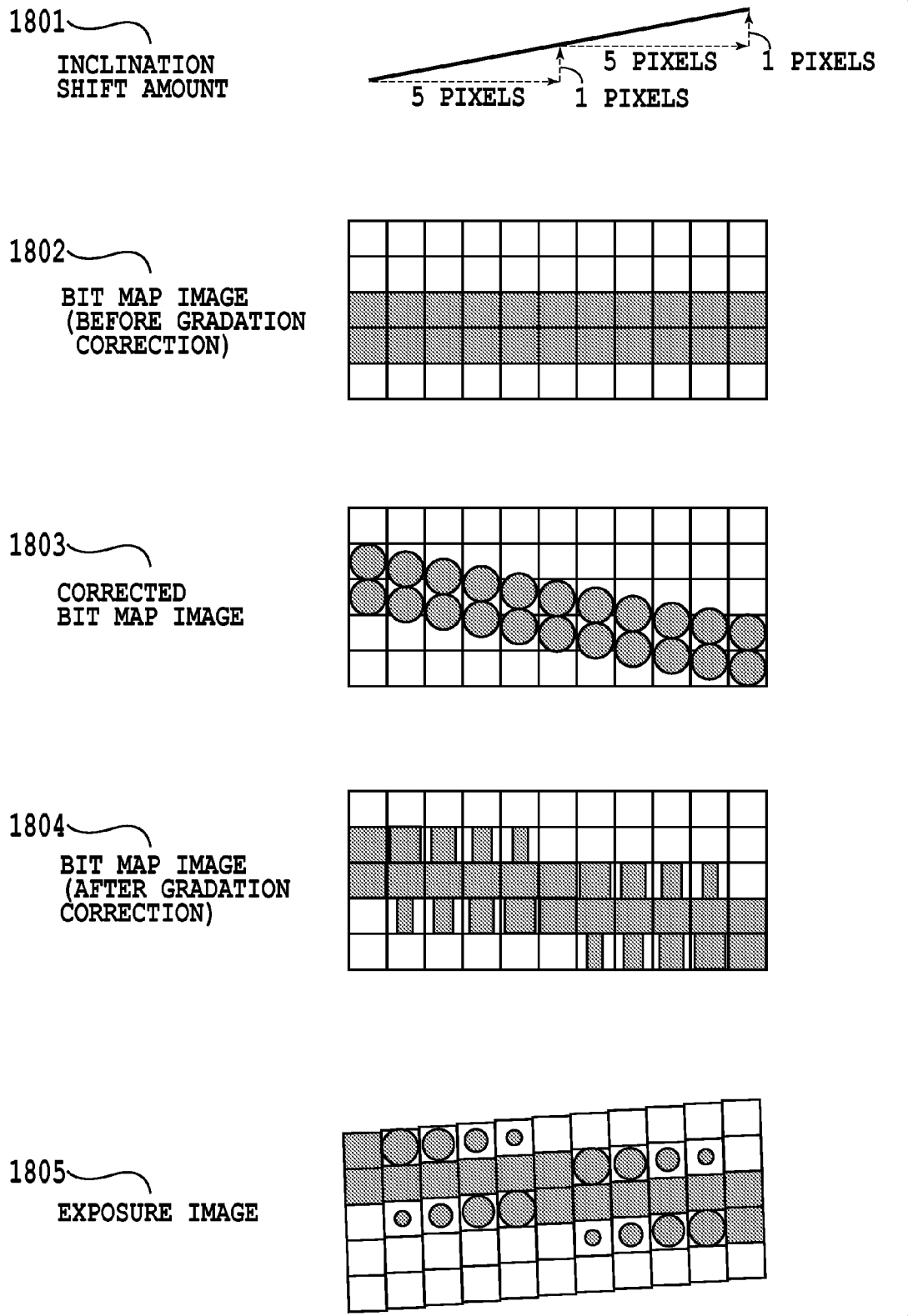
FIG. 18 is a diagram showing a registration shift correction less than one pixel in a conventional art.

The image processing unit 402 includes a CPU (not shown in the drawing) configured to perform processing operations such as various computations, controls, and determinations, and a ROM (not shown in the drawing) configured to store control programs of processing performed by this CPU shown in FIGS. 11, 12 and 14, or the like. Also, the image processing unit 402 includes a RAM for temporarily storing data for the CPU during processing operation, input data, or the like, a non-volatile memory such as a flash memory or SRAM, and the like.

An image generating unit 404 generates raster image data capable of print processing, from print data received from a computer apparatus (not shown in the drawing) or the like, and outputs the generated data for each pixel as RGB data and attribute data representing a data attribute of each pixel. Note that the image generating unit 404 may be configured to treat image data from a reading means such as a scanner which is configured within the color image forming apparatus, instead of the image data received from the computer apparatus or the like. Here, the reading means includes at least a CCD (Charge Coupled Device) or a CIS (Contact Image Sensor). Also, the reading means may be configured additionally to include a processing unit performing predetermined image processing on the read image data. Further, the reading means may not be configured within the color image forming apparatus and the data may be received from the reading means via an interface (not shown in the drawing).

A color conversion processing unit denoted by Reference numeral 405 converts the above RGB data into CMYK data matching to toner colors of the image forming unit 401 and stores the CMYK data and attribute data into a bit map memory 406 which is a storage unit. The storage unit 406 is a first storage unit provided to the image processing unit 402 and stores temporarily the raster image data for the print processing. Note that the storage unit 406 may be configured as a page memory storing image data of one page or configured as a band memory storing data of multiple lines.

A halftone processing unit denoted by Reference numerals 407C, 407M, 407Y, or 407K performs halftone processing on the attribute data and image data of each color output from the storage unit 406. The halftone processing unit is configured specifically by using screen processing or error diffusion processing. In the screen processing, conversion to N values is performed by use of predetermined multiple dither matrixes and the input image data. Also in the error diffusion processing, conversion to N values is performed by comparison of the input image data with a predetermined threshold value and the difference between the input image data and the threshold value is diffused to surrounding pixels which are subsequently subjected to the conversion processing to N values.

A second storage unit provided within the image forming apparatus, denoted by Reference numeral 408, stores the N-value converted data processed by the halftone processing unit 407 (407C, 407M, 407Y, or 407K). Note that, in a case in which a pixel position where image processing is performed in the storage unit 408 or the subsequent processes is a scan line changing point, the transferring by one pixel is performed when the data is read from the storage unit 408. That is, the CPU performs the transfer processing for the output N-value converted data (image data) when reading the data from the storage unit 408. Also, timing of reading the N-value converted data from the storage unit 408 is not synchronized among C, M, Y, and K for reasons regarding an arrangement of the photosensitive drums and the like.

Figure 8:
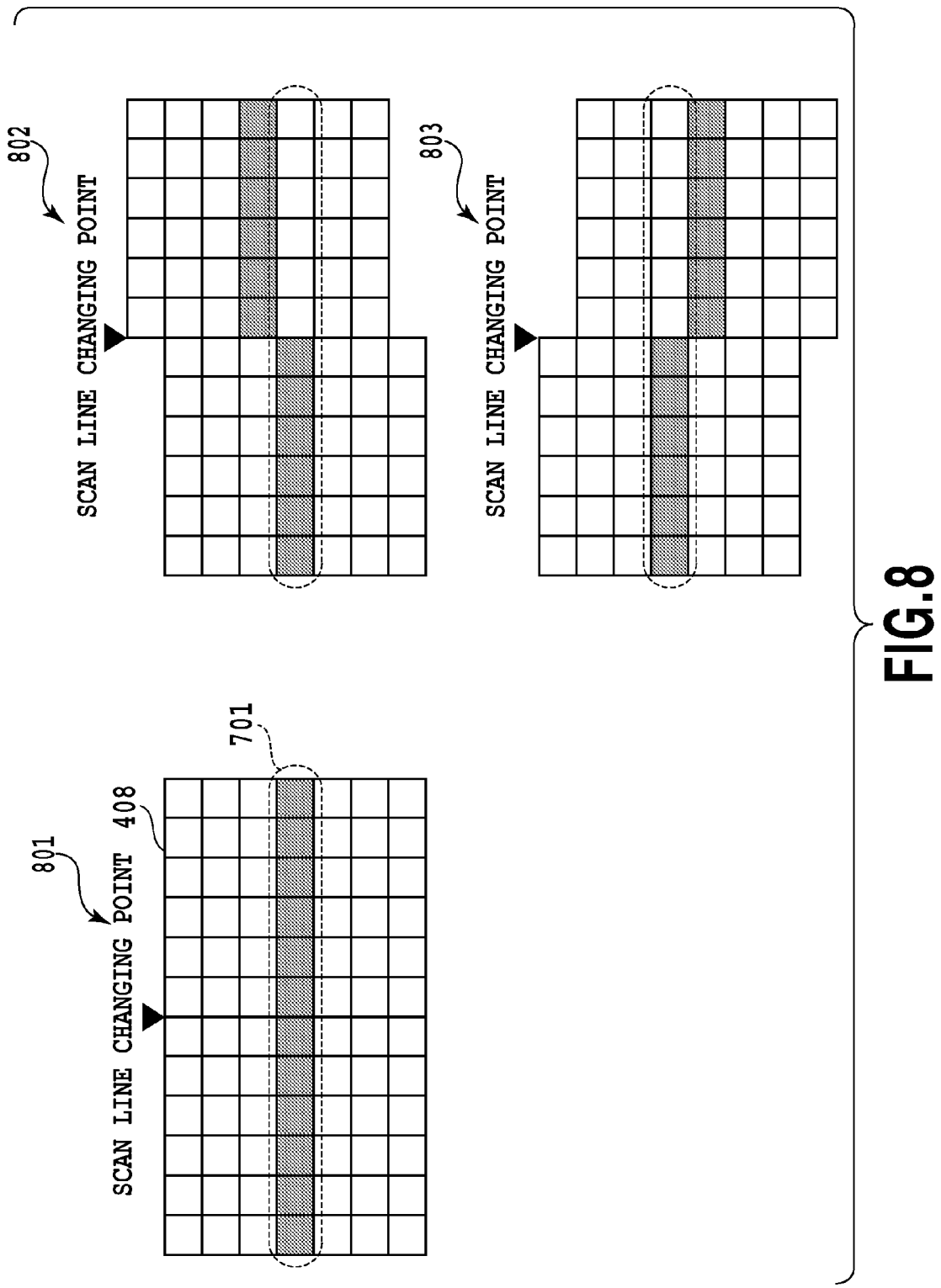
FIG. 8 is a diagram for illustrating a status of data retained by a storage unit 408.

In FIG. 8, Reference numeral 801 denotes a schematic diagram showing a state of the data retained in the storage unit 408. As shown in the diagram denoted by Reference numeral 801, in the stored state in the storage unit 408, the data after the processing by the halftone processing unit 407 is retained without depending on the correction direction of the image processing unit 402 or the curve characteristic of the image forming unit 401. When a line 701 in the diagram denoted by Reference numeral 801 is read out, the line is shifted upward by one pixel at a boundary of the scan line changing point as shown in the diagram denotes by Reference numeral 802, in a case when the image processing unit 402 is to correct the profile characteristic in the upward direction. Also, in a case when the image processing unit 402 is to correct the profile characteristic in the downward direction, the image data of the line 701 is shifted downward by one pixel at a boundary of the scan line changing point when the data is read from the storage unit 408 as shown in the diagram denotes by Reference numeral 803.

That is, the CPU determines a scan line changing point in the N-value converted data stored in the storage unit 408 according to the profile characteristic stored in a profile data unit 403. Then, the CPU corrects the registration shift by one pixel by shifting the N-valued converted data by one pixel at the scan line changing point in the sub-scan direction. This transfer processing performs the coordinate conversion in each region of a noticeable line and corrects the registration shift by one pixel.

Note that the profile characteristic of each color 415C, 415M, 415Y, or 415K is stored preliminarily in the profile data unit 403 provided to the image forming unit 401.

An interpolation determination unit denoted by Reference numeral 409 includes interpolation determination units for respective colors. Here, whether a pixel needs the interpolation or does not need the interpolation in the subsequent processing is determined as a processing for a pixel before and after the scan line changing point in the input N-value converted data. Also, the interpolation determination unit 409 includes a timing adjusting unit for synchronizing the determination result with the N-value converted data.

A transfer buffer denoted by Reference numerals 410C, 410M, 410Y, or 410K retains temporary determination result information about the interpolation determination result by the interpolation determination unit 409 and output data of the timing adjusting unit. Note that, while the first storage unit 406, the second storage unit 408 and the transfer buffer 410 are described to be configured separately in the present embodiment, the image forming apparatus may be configured to have a common storage unit internally.

Figure 5:
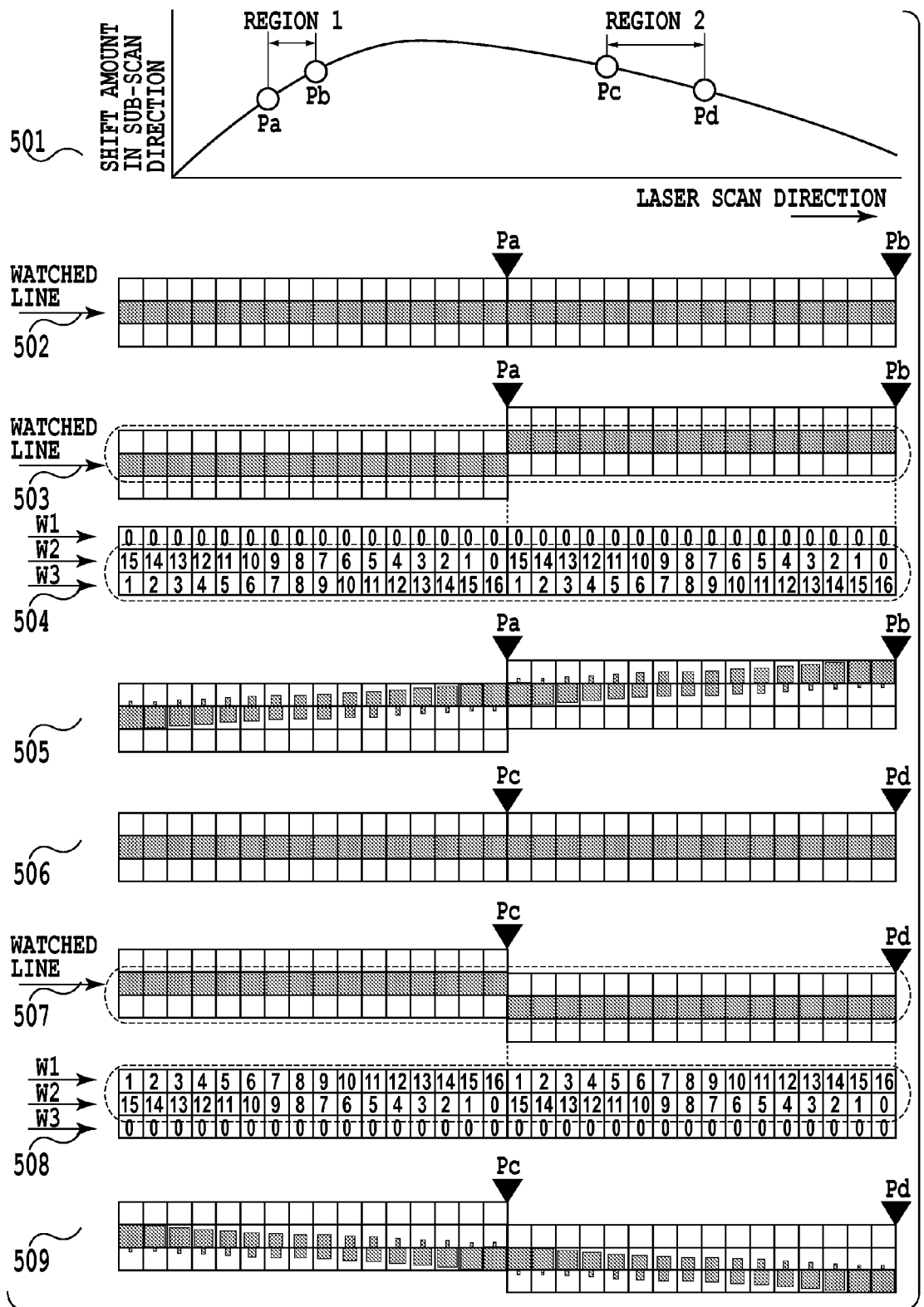
FIG. 5 is a diagram for illustrating an interpolation method at a scan line changing pointscan line changing point according to an embodiment of the present invention.

An interpolation processing unit denoted by Reference numerals 411C, 411M, 411Y, or 411K performs interpolation processing on the data received from the transfer buffer 410 according to the determination result information by the interpolation determination unit 409 transferred also from the transfer buffer. While the determination result from the interpolation determination unit 409 is a determination for each pixel, the interpolation processing in the interpolation processing unit 411 uses pixels before and after the scan line changing point corresponding to the curve characteristic of the image forming apparatus. FIG. 5 shows an interpolation method at the scan line changing point.

Reference numeral 501 denotes a diagram showing a profile characteristic of the image forming apparatus in the laser scan direction. A region 1 is where the image processing unit 402 should perform an upward correction, and, on the other hand, a region 2 is where the image processing unit 402 should perform a downward correction. Note that, in the following description of the interpolation processing, the minimum spacing between the scan line changing points is set to be 16 pixels for convenience of explanation, but the present embodiment is not limited to this setting. That is, the spacing may be set to be arbitrary pixels or a power of two pixels for simplifying a circuit configuration.

The diagram denoted by Reference numeral 502 shows an image before scan line changing before and after the scan line changing point Pa, that is, an output image data arrangement from the halftone processing unit 407, in the example denoted by Reference numeral 501. A line to be watched is a center line in the image data of three lines shown in the diagram. When the noticeable line is focused, a result of the transfer processing by one pixel, that is, the image data arrangement output from the storage unit 408, is shown in the diagram denoted by Reference numeral 503. The scan line changing point processing over one pixel is performed when the data is read from the storage unit 408, and a pixel arrangement before and after the scan line changing point Pa appears as a large step at a boundary of the scan line changing point Pa when the data is input into the interpolation processing unit 411.

The interpolation processing unit 411 performs the interpolation processing on the image data appearing as a step on the noticeable line. That is, the interpolation processing unit 411 performs the registration shift correction less than one pixel on the image data subjected to the registration shift correction by one pixel. Since the correction direction is upward in the region 1, the interpolation processing of the noticeable line is performed by a weighted computation including image data of the following line (upstream side line in the sub-scan direction). In the present embodiment, the weighting is described such that a sum of the weights of two object pixels in the sub-scan direction becomes 16 which are equal to the minimum spacing between the scan line changing points as shown in the diagram denoted by Reference numeral 504. In the present embodiment, however, the sum of the weighting coefficients is not limited to 16. The sum of the weighting coefficients may be a power of two to simplify a circuit used for the computation or the computation may be carried out using arbitrary coefficients to improve accuracy.

Also for the weight arrangement, as described below, the weighting coefficient may be changed for a pixel or a common weighting coefficient may be used for a plurality of pixels as shown in the diagrams denoted by Reference numerals 601 and 604 in FIG. 6. Further, the number of pixels to be used may be changed according to the weighting coefficient value. Note that the following description is made by assuming that a basic position for the interpolation is on the left side, since the scan line changing point is defined to be a position in the laser scan direction where one pixel shift is caused in the sub-scan direction.

A computational formula used for the interpolation is as follows (Formula 1).

(Interpolated pixel value)=$W1\times$(Value of a pixel preceding the noticeable line by one line)+$W2\times$(Value of a pixel in the noticeable line)+$W3\times$(Value of a pixel following the noticeable line by one line) (Formula 1).

Note that, in the formula 1, W1, W2, and W3 are arbitrary weighting coefficients. Also, the pixel preceding the noticeable line by one line is a pixel included in the line on the downstream side by one line in the sub-scan direction from the noticeable line. Further, the pixel following the noticeable line by one line is a pixel included in the line on the upstream side by one line in the sub-scan direction from the noticeable line.

In the present embodiment, the above weighting coefficients W1, W2, and W3 are used for converting a gradation value of each pixel value for a correction less than one pixel and is stored in a gradation value converting table (not shown in the drawings).

Reference numeral 505 denotes a conceptual diagram of the interpolation pixel value obtained from the above formula 1 in the present embodiment. By the interpolation using the formula 1, before the scan line changing point Pa, a pixel nearer to the scan line changing point Pa is affected more by a pixel value in the following line and a pixel farther from the scan line changing point Pa is affected more strongly by the noticeable line, that is, a black data line. Also, for pixels after the scan line changing point Pa, a pixel nearer to the scan line changing point Pa is affected more strongly by the noticeable line and a pixel farther from the scan line changing point Pa is affected more by the line following the noticeable line.

Next, the region 2 where the downward correction should be performed will be described. For the downward correction, the weighting coefficients used for the interpolated pixel value computation are set to the noticeable line and the preceding line of the noticeable line (line on the downstream side in the sub-scan direction).

Reference numeral 506 denotes the image data when output from the halftone processing unit 407, and Reference numeral 507 denotes the image data when read by the storage unit 408. Since the downward correction is performed at the scan line changing point Pc, a transfer processing step over one pixel appears at a boundary of the scan line changing point Pc as shown in the diagram denoted by Reference numeral 507. For the downward correction, the values of W1, W2, and W3 are shown in the diagram denoted by Reference numeral 508, and the sum of the weighting coefficients is set to be 16 as same as the upward correction for convenience of explanation.

By applying the formula 1 also to the downward correction, the interpolation pixel value is obtained at a boundary of the scan line changing point Pc. That is, before the scan line changing point Pc, a pixel nearer to the scan line changing point is affected more by a pixel value of the preceding line, and a pixel farther from the scan line changing point Pc is affected more strongly by the noticeable line. Also, after the scan line changing point Pc, a pixel nearer to the scan line changing point Pc is affected more by the noticeable line, and a pixel farther from the scan line changing point Pc is affected more by the line preceding the noticeable line (Reference numeral 509).

In this manner, the interpolation processing unit 411 corrects a registration shift less than one pixel according to the profile characteristic and the gradation value converting table.

Note that, while the registration shift less than one pixel is corrected by using the formula 1, obviously the present embodiment is not limited to this method. That is, if the amount of exposure of laser exposure can be calculated for each pixel, any method may be used for performing the above correction of less than one pixel. For example, as disclosed in Japanese Patent Laid-Open No. 2004-170755, distribution ratios of the exposure amount for pixels, preceding and following a certain pixel in the sub-scan direction, may be calculated from a shift amount in the sub-scan direction and exposure amounts thereof may be calculated according to the distribution ratios.

Further, the registration shift correction of less than one pixel may be performed by increasing the rotation speed of a deflection-scan device according to the profile characteristic to improve a resolution in the sub-scan direction.

That is, in the present embodiment, the interpolation processing unit 411 performs the registration shift correction of less than one pixel, if desired, on the image data subjected to the registration shift correction by one pixel according to the profile characteristic.

In this manner, the interpolation processing by the interpolation processing unit 411 prevents or suppresses a large step which is caused by the transfer processing step over one pixel from appearing in image data continuous in the main-scan direction, either for the upward interpolation direction or for the downward interpolation direction.

A pulse width modulation (PWM) unit denoted by Reference numeral 412 converts the image data for each color output from the interpolation processing unit 411 into an exposure time for the scanner unit 413C, 413M, 413Y, or 413K. Then, the converted image data is output from a print unit 414 in the image forming unit 401.

Note that the profile characteristic data, already described using the diagrams denoted by Reference numerals 901 to 903, is retained in the image forming unit 401 within the image forming apparatus as a characteristic specific to the apparatus as described above. Then, the image processing unit 402 performs the processing according to the profile characteristic retained in the image forming unit 401 (profiles 415C, 415M, 415Y, or 415K).

That is, the CPU included in the image forming unit 401 performs a computation according to the curve characteristic preliminarily retained in the ROM or the like, and obtains the profile characteristic which becomes the registration shift correction amount. This obtained profile characteristic is stored in a profile data unit 403. By thus storing, it is possible to obtain the profile characteristic just by readout from the profile data unit 403 without computing the profile characteristic again for the next print processing. Note that obviously the profile characteristic may be obtained by the computation each time carrying out print processing. Also, the profile characteristic may be obtained before product shipment and stored in the profile data unit 403 preliminarily at shipping.

That is, in the present embodiment, the profile characteristic may be preliminarily prepared or may be obtained by computation each time carrying out print processing. In the present embodiment, how to obtain the profile characteristic is not an essential point and the profile characteristic may be stored in a predetermined storage means when the transfer processing is performed on image data to be printed.

Next, the most characteristic part of the present embodiment will be further described with reference to other drawings.

<Interpolation Determination Unit>

Figure 10A:
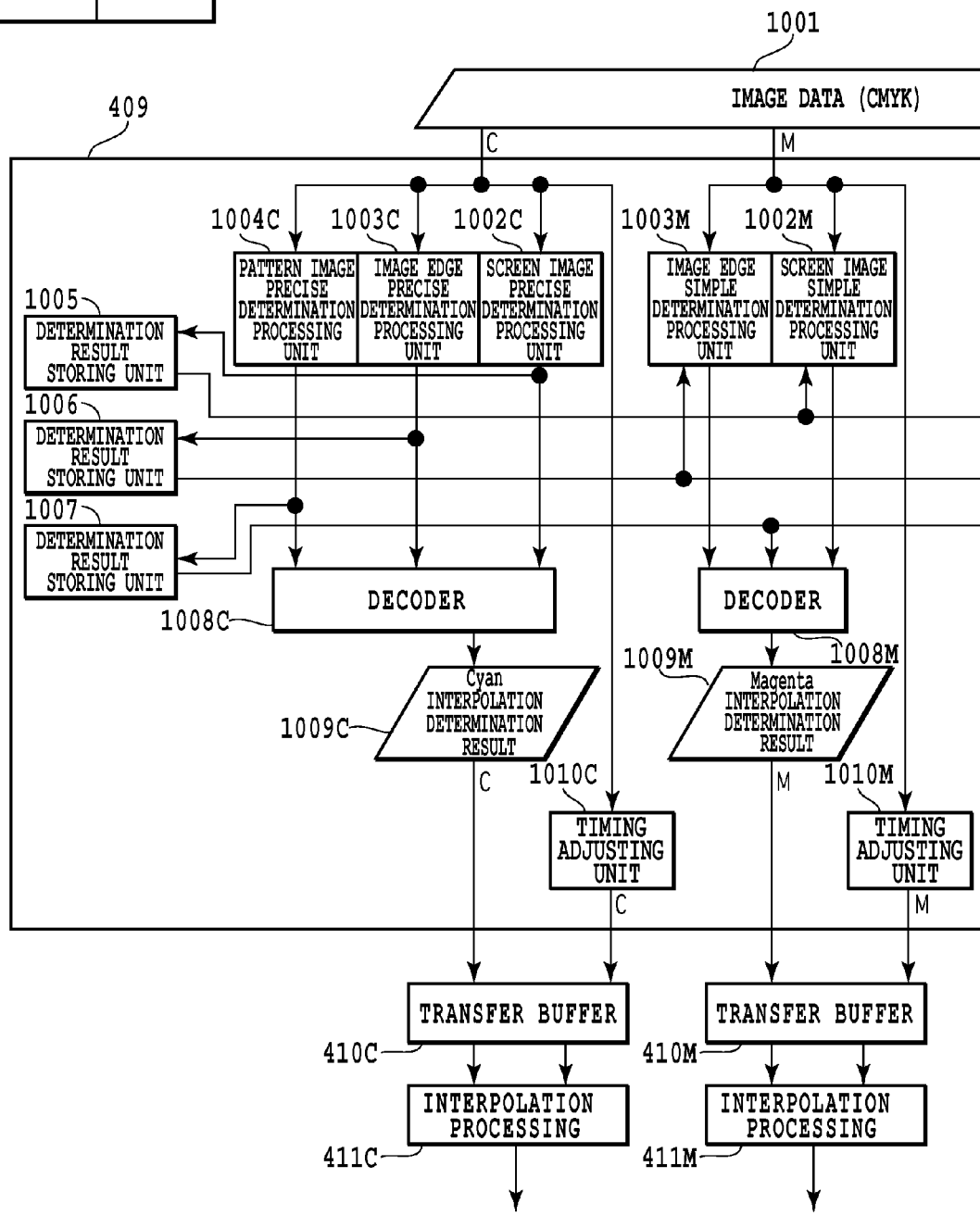
FIGS. 10A and 10B are a diagram showing a detailed configuration of the interpolation determination unit according to an embodiment of the present invention.
Figure 10B:
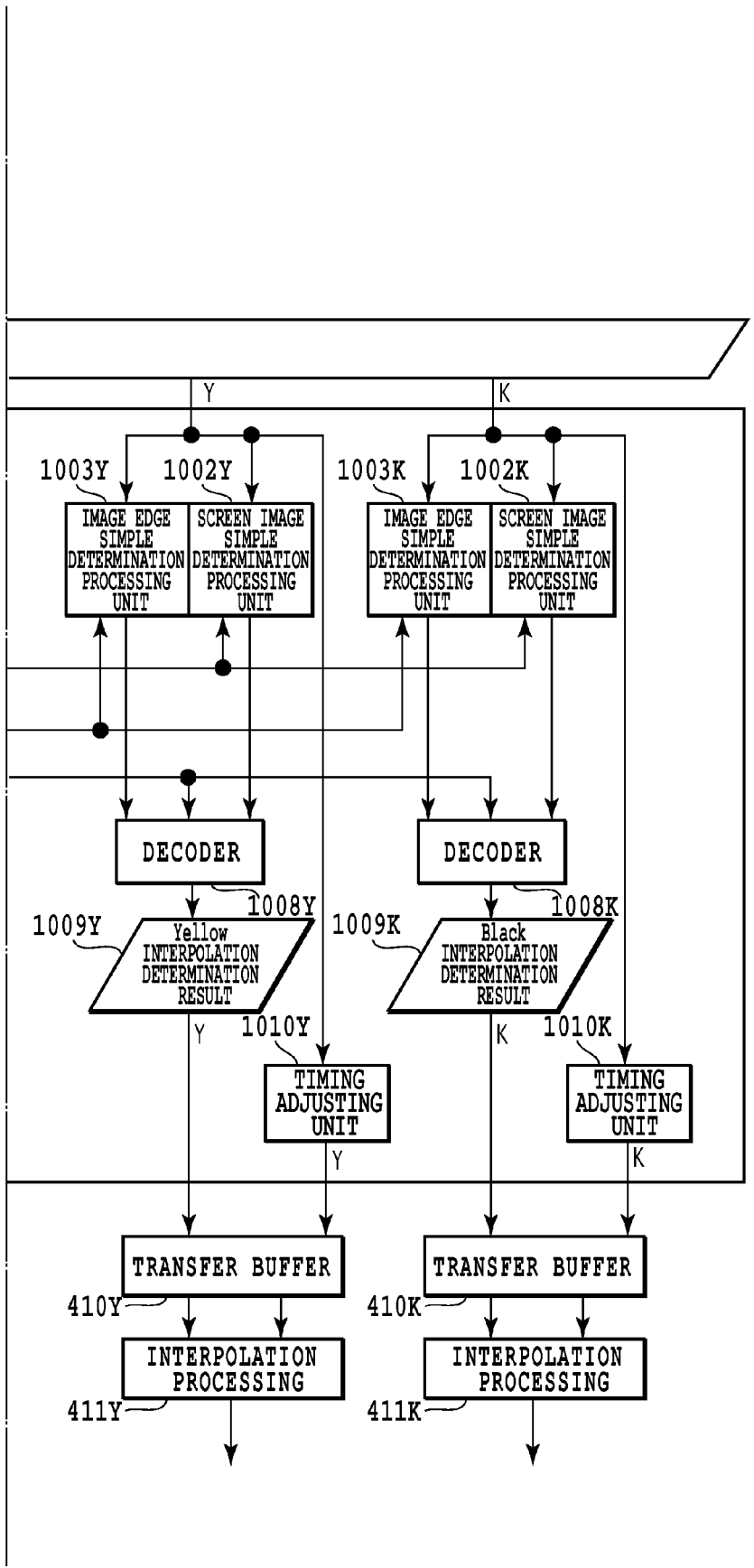

The processing related to the interpolation determination unit 409 shown in FIGS. 4A and 4B is one of the characteristic features of the present embodiment. Here, details of this interpolation determination unit 409 are shown in FIGS. 10A and 10B.

A main function of the interpolation determination unit 409 is to determine whether or not the interpolation processing is to be performed on a watched pixel for each color and to output the result thereof together with the watched pixel data for each of C, M, Y and K at the same timing. This interpolation determination unit 409 is divided internally into a path for mainly extracting the interpolation determination result (determination result information) and a path for outputting the image data and the extracted result at the same timing. That is, the interpolation determination unit 409 outputs the image data for each color output from the storage unit 408 to an image determination processing unit and the timing adjusting unit described hereinafter.

As described above, the image data 1001 is input asynchronously among C, M, Y, and K into the interpolation determination unit 409 from the storage unit 408. That is, the image data of each color is input individually into the interpolation determination unit 409 in a predetermined order. Here is shown an example of a system in which the image data is input in the order of C (first), M (second), Y (third) and K (fourth), and inside details will be described from the firstly input cyan.

First, the interpolation determination unit 409 determines the kind of image for obtaining the interpolation determination result. The kind of image means a characteristic of the image, for example, a screen image, an error diffusion image, or a pattern image (an image matching to a particular pattern), and further a character image, a line image, a copy-forgery-inhibited pattern image, an edge portion of an image, or the like. That is, the present embodiment detects at least one or more characteristics for each pixel (first detection). The present embodiment determines among the screen image, the image edge, and the pattern image, for example.

A screen image precise determination processing unit 1002C determines whether or not a pixel to be subjected to the interpolation determination processing (hereinafter, watched pixel) is a pixel in a screen image for cyan. That is, it is determined whether or not the image characteristic of each pixel shows the screen image. The image determination is performed precisely by a pattern matching using a number of line buffers. When having determined that the watched pixel is a pixel in a screen image, the screen image precise determination processing unit 1002C outputs information indicating whether or not the watched pixel is a pixel in a screen image to a determination result storing unit 1005 as characteristic determination result information A. The screen image precise determination processing unit 1002C outputs the characteristic determination result information A also to a decoder 1008C.

An image edge precise determination processing unit 1003C determines whether or not the watched pixel is a pixel in an image edge for cyan. That is, it is determined whether or not the image characteristic of each pixel shows the edge portion. This determination is also performed precisely by the pattern matching using a number of line buffers similar to the screen image determination. When having determined that the watched pixel is a pixel in an edge portion, the image edge precise determination processing unit 1003C outputs information indicating whether or not the watched pixel is a pixel in an edge portion to a determination result storing unit 1006 as characteristic determination result information B. The image edge precise determination processing unit 1003C outputs the characteristic determination result information B also to the decoder 1008C.

A pattern image precise determination processing unit 1004C determines whether or not the watched pixel is a pixel in a pattern image for cyan. That is, it is determined whether or not the image characteristic of each pixel shows a pattern image. This determination is also similarly performed precisely by the pattern matching using a number of line buffers. Note that the pattern images include a pattern to be subjected to the interpolation processing and a pattern not to be subjected to the interpolation processing. Therefore, two sets of information are output here as a determination result; interpolation processing ON pattern matching information and interpolation processing OFF pattern matching information which includes an instruction not to perform the interpolation processing.

When having determined that the watched pixel is a pixel in a pattern image, the pattern image precise determination processing unit 1004C determines whether or not the pattern image of the watched pixel is suitable for the interpolation processing. Then, the pattern image precise determination processing unit 1004C outputs either the interpolation ON pattern matching information or the interpolation processing OFF pattern matching information according to the determination result to a determination result storing unit 1007 as a characteristic determination result information C. The pattern image precise determination processing unit 1004C outputs the characteristic determination result information C also to the decoder 1008C.

Here, the screen image precise determination processing unit 1002C, the image edge precise determination processing unit 1003C, and the pattern image precise determination processing unit 1004C are referred as to image determination processing units. These respective image determination processing units detect the image characteristics of each pixel for the first color of the multiple colors. Also, these respective image determination processing units may binarize the image data before the pattern matching processing in order to improve the pattern matching accuracy.

The determination result storing unit 1005 temporarily stores the characteristic determination result in the screen image precise determination processing unit 1002C so as to be referred to when the same watched pixel is processed for other colors (M, Y, and K). Also, the determination result storing unit 1006 temporarily stores the determination result in the image edge precise determination processing unit 1003C so as to be referred to when the same watched pixel is processed for other colors (M, Y, and K). In the present embodiment, the characteristic determination result information stored in the determination result storing units 1005 and 1006 is information about what is the characteristic of the watched pixel.

The determination result storing unit 1007 temporarily stores the determination result in the pattern image precise determination processing unit 1004C so as to be referred to when the same watched pixel is processed for other colors (M, Y, and K). In the present embodiment, the characteristic determination result information stored in the determination result storing unit 1007 is information indicating whether or not the interpolation processing is to be performed on the watched pixel.

Next, the decoder 1008C receives the characteristic determination result information from the screen image precise determination processing unit 1002C, the image edge precise determination processing unit 1003C, and the pattern image precise determination processing unit 1004C, and outputs final interpolation determination result information. Here, an example of relationships between inputs of the respective determination results and the interpolation ON/OFF outputs is shown in FIG. 15. As shown in the diagram, the interpolation ON is output for the interpolation processing ON pattern and the interpolation OFF is output for the interpolation processing OFF pattern, for example. Further, there are possible cases that the interpolation ON is output when the image is neither the interpolation processing ON pattern nor the interpolation processing OFF pattern and is not also the screen image, and that the interpolation ON is output when the image is determined to be the screen image and also the image edge portion. In this manner, the decoder 1008C outputs cyan interpolation determination result information 1009C.

That is, the decoder 1008C determines whether or not to perform the registration shift correction of less than one pixel for each pixel according to respective sets of the characteristic determination result information (characteristic detection results) output from the image determination processing units. That is, it is determined for one color, cyan, whether or not to perform the interpolation processing according to the characteristic determination result information A to C output from the image determination processing units, corresponding to the plurality of characteristics, respectively. This determination result, that is, the interpolation determination result information is output to the transfer buffer 410C.

The original input image data is also output together with this interpolation determination result information 1009C at the same timing. The timing adjustment is performed in the timing adjusting unit 1010C. This information and data are the outputs of the interpolation determination processing unit 409 and output to the transfer buffer 410C.

In this manner, the present embodiment detects the image characteristic and determines whether or not to perform the registration shift correction of less than one pixel according to the detected characteristic, and thereby can perform the interpolation processing only when the registration shift correction of less than one pixel is appropriate. Also, by detecting two or more characteristics, it is possible to increase interpolation determination result patterns as shown in FIG. 15 and to perform a more appropriate registration shift correction on each pixel.

Next, processing for magenta (second color) will be described.

A screen image simple determination processing unit 1002M determines whether or not the watched pixel is a pixel in a screen image for magenta. Here, the image determination is performed by adding the image determination result for cyan in the preceding processing and the determination processing for magenta itself is simpler than that for cyan. For example, the line buffer for the determination can be configured in a smaller number than that for cyan. Also, the screen image determination result for cyan is configured to be able to be referred to also for magenta by readout from the determination result storing unit 1005.

The screen image simple determination processing unit 1002M refers to the characteristic determination result information A stored in the determination result storing unit 1005 and detects the characteristic of each pixel for magenta after the characteristic detection for cyan (at a different timing). According to the detected characteristic, the screen image simple determination processing unit 1002M outputs characteristic determination result information A', which indicates whether or not the watched pixel is a pixel in a screen image for magenta, to a decoder 1008M. In the present embodiment, the characteristic determination result information A is information indicating whether or not to be the screen image, and by referring to this information, it is possible to easily identify the characteristic of the watched pixel without performing complicated processing.

An image edge simple determination processing unit 1003M determines whether or not the watched pixel is a pixel in an image edge for magenta. Here, the edge determination is performed by adding the image edge determination result for cyan in the preceding processing similarly to the screen image determination, and the determination processing for magenta itself is simpler than that for cyan. Also, the image edge determination result for cyan is configured to be able to be referred to for magenta by readout from the determination result storing unit 1006.

The image edge simple determination processing unit 1003M refers to the characteristic determination result information B stored in the determination result storing unit 1006 and detects the characteristic of each pixel for magenta after the characteristic detection for cyan (at a different timing). According to the detection result, the image edge simple determination processing unit 1003M outputs characteristic determination result information B', which indicates whether or not the watched pixel is a pixel in an image edge portion for magenta, to the decoder 1008M.

Next, the decoder 1008M receives the characteristic determination result information from the screen image simple determination processing unit 1002M, the image edge simple determination processing unit 1003M, and the pattern image precise determination processing unit 1004C, and outputs final interpolation determination result information. Here, the pattern image determination is not performed for magenta and the result for cyan is utilized. The pattern image determination result for cyan can be referred to also for magenta by reading the characteristic determination result information C from the determination result storing unit 1007 and the reference result is input directly into the decoder 1008M. Relationships between inputs of the respective determination results and the interpolation ON/OFF outputs in the decoder 1008M are the same as those in the decoder 1008C described above as shown in FIG. 15. In this manner, magenta interpolation determination result information 1009M is output from the decoder 1008M.

That is, the decoder 1008M determines whether or not to perform the registration shift correction of less than one pixel on each pixel according to each set of the input characteristic determination result information. This determination result, that is, the interpolation determination result information is output to the transfer buffer 410M.

The original input image data is also output together with this determination result 1009M at the same timing. The timing adjustment is performed in the timing adjusting unit 1010M. These information and data are the output of the interpolation determination processing unit 409 for magenta image data and output to the transfer buffer 411M.

Further, processing for yellow (third color) and black (fourth color) is performed similarly to above-described processing. That is, the interpolation determination processing is performed by referring to the screen image determination result, image edge determination result, and pattern image determination result for cyan (first color) in the determination result storing units 1005, 1006, and 1007, respectively.

FIG. 1 shows a simplified configuration of the present embodiment for easy understanding. In an interpolation determination unit 100, Reference numeral 101 denotes image data of each color which is input asynchronously. In preceding processing, image determination for cyan 102C is performed precisely, and the result is retained in a storage unit 103 to be applied for the image determination for subsequently processed colors (102M, 102Y, and 102K). A decoder 104 calculates an interpolation determination result 105 by using these results.

In this manner, in the present embodiment, the image characteristic of each pixel is detected for colors except for the first color (here, cyan) among the multiple colors after the characteristic has been detected for the first color, and the characteristic determination result detected for the first color is used for this following detection. Thereby, it is possible to simply detect the characteristic of the watched pixel just by reading the above characteristic determination result information without using a circuit such as needed for the characteristic detection for the first color. That is, when judging whether or not the interpolation processing is necessary for all the multiple colors, it is possible to detect the image characteristic, which becomes a basis of the judgment, for the colors except for the fist color without using a circuit such as needed for the first color. Therefore, it is possible to perform the interpolation processing only on a pixel which needs the processing in a simple configuration without using a large scale circuit.

As described above, it is determined whether or not the registration shift correction of less than one pixel (interpolation processing) is appropriate, according to what is the image characteristic (screen image, edge portion, background pattern, pattern image, or the like). Therefore, the present embodiment detects at least one or more image characteristics for each pixel, judges whether or not the interpolation processing is appropriate for the detected characteristics, and determines whether or not to perform the interpolation processing.

Further, for the characteristic needed for this determination, the image characteristic of each pixel is detected first for the first color of the multiple colors according to the input image data (first detection). At this time, since the characteristic is detected according to the image data, a circuit having the same size as that for usual detection may be used. Next, for colors except for the first color, the present embodiment detects the image characteristic by not using the image data but using the characteristic detection result (characteristic determination result) for the first color (second detection). That is, for the colors except for the first color, the characteristic is not detected according to the image data, but the characteristic is detected according to the characteristic determination result, and thereby it is not necessary to use a circuit such as described above for the characteristic detection. Accordingly it is possible to reduce the circuit size.

Note that, while the determination processing is simplified for magenta, yellow, or black, the present embodiment is not limited to this method. In the present embodiment, an essential point is to reduce the circuit size for the characteristic determination and the characteristic determination for at least one color among the multiple colors may be performed in a simplified manner. Accordingly, not for all the colors but for at least one or more colors, image characteristic of each pixel is detected according to the image data of the above at least one or more colors (detailed characteristic determination processing). Further, for the image data of colors except for the above at least one or more colors among the above multiple colors, the image characteristics of each pixel are detected by using the characteristic determination results for the at least one or more colors (simple characteristic determination processing), and thereby it is possible to achieve an object of the present invention.

In the present embodiment, it is necessary to process the color to be subjected to the detailed characteristic determination processing and the color to be subjected to the simple characteristic determination processing asynchronously for performing the simple characteristic determination processing by using the result of the detailed characteristic determination processing. That is, in the present embodiment, the color to be subjected to the simple characteristic determination processing is input into the interpolation determination unit 409 and subjected to the simple characteristic determination processing, after the color to be subjected to the detailed characteristic determination processing has been input into the interpolation determination unit 409 and subjected to the detailed characteristic determination processing.

<Interpolation Determination Process Flow>

FIG. 11 and FIG. 12 show an example of flowcharts showing the processing of the image data for a color to be processed in the preceding processing and the image data for colors to be processed in the following processing within the interpolation determination unit 409 (first determination). These flowcharts show processes from a step of receiving the image data CMYK-asynchronously in the interpolation determination unit 409 to a step of outputting the image data for each color together with the interpolation determination result. Also here, description will be given similarly assuming that the image data for cyan is processed in the preceding processing.

The process flow of the image data for cyan processed in the preceding processing will be explained with reference to FIG. 11.

A step S101 starts to input the cyan image data into the interpolation determination unit 409. That is, the interpolation determination unit 409 obtains the cyan image data from the storage unit 408.

Next, steps S102, S104, and S106 determine the kind of input cyan image data. In the step S102, the pattern image precise determination processing unit 1004C detects the image characteristic of each pixel according to the cyan image data to determine whether or not the pixel is a pixel in a pattern image. In the step S104, the image edge precise determination processing unit 1003C detects the image characteristic of each pixel according to the cyan image data to determine whether or not the pixel is a pixel in an image edge portion. In the step S106, the screen image precise determination processing unit 1002C detects the image characteristic of each pixel according to the cyan image data to determine whether or not the pixel is a pixel in a screen image. In the steps S102, S104, and S106, the input image data is held in a number of line buffers and the processing is performed precisely by the pattern matching.

Subsequently, steps S103, S105, and S107 write the respective determination results into the determination result storing units 1005, 1006 and 1007. That is, in the step S103, the pattern image precise determination processing unit 1004C stores the characteristic determination result information C into the determination result storing unit 1007. In the step S105, the image edge precise determination processing unit 1003C stores the characteristic determination result information B into the determination result storing unit 1006. In the step S107, the screen image precise determination processing unit 1002C stores the characteristic determination result information A into the determination result storing unit 1005.

Next, a step S108 determines the interpolation ON/OFF, that is, whether or not the interpolation processing is to be performed. This interpolation ON/OFF determination utilizes the above described image determination result (characteristic determination result information) in the steps S102, S104, and S106. That is, in the step S108, the decoder 1008C performs the interpolation ON/OFF determination for each pixel according to each set of the characteristic determination result information described above.

Subsequently, in a step S109, if the result of the step S108 is interpolation ON, the interpolation determination unit 409 outputs the result of the interpolation ON (characteristic determination result information instructing to perform the interpolation processing) together with the cyan image data.

Also in a step S110, if the result of the step S108 is interpolation OFF, the interpolation determination unit 409 outputs the result of the interpolation OFF (characteristic determination result information instructing not to perform the interpolation processing) together with the cyan image data.

Next, the image data processing flow for magenta, yellow, and black (second determination) processed in the following processing will be described with reference to FIG. 12.

A step S201 starts to input the image data of magenta, yellow, and black (hereinafter, MYB image data) into the interpolation determination unit 409. That is, the interpolation determination unit 409 obtains the MYB image data from the storage unit 408.

Subsequently, steps S202 and S204 read the image edge determination result and the screen image determination result for cyan processed in the preceding processing from the determination result storing units 1005 and 1006, respectively. That is, in the step S202, the image edge simple determination processing units for the respective colors (1003M, 1003Y and 1003K) read the characteristic determination result information B from the determination result storing unit 1006. In the step S204, the screen image simple determination processing units for the respective colors (1002M, 1002Y, and 1002K) read the characteristic determination result information A from the determination result storing unit 1005.

Next, steps S203 and S205 perform the image edge determination and the screen image determination of the MYB image data, respectively. These steps simplify the image determinations of the MYB image data itself by adding the image determination results (characteristic determination result information) for cyan read in the steps S202 and S204, respectively. For example, the line buffer can be configured in a smaller number than that for cyan. That is, in the step S203, the image edge simple determination processing units for the respective colors (1003M, 1003Y, and 1003K) determine whether or not the image edge portion according to the read characteristic determination result information B. Also in the step S205, the screen image simple determination processing units for the respective colors (1002M, 1002Y, and 1002K) determine whether or not to be the screen image according to the read characteristic determination result information A.

In parallel with these steps, a step S206 also reads the pattern image determination result (characteristic determination result information) for cyan from the determination result storing unit 1007. That is, in the step S206, the decoders for the respective colors (1008M, 1008Y, and 1008K) read the characteristic determination result information C from the determination result storing unit 1007.

Next, a step S207 determines the interpolation ON/OFF. This interpolation ON/OFF determination utilizes the above described image determination results in the steps S203, S205, and S206. That is, in the step S207, the decoders for the respective colors (1008M, 1008Y, and 1008K) determine the interpolation ON/OFF for each pixel according to the above described respective sets of the characteristic determination result information.

Subsequently, in a step S208, if the result of the step S207 is interpolation ON, the interpolation determination unit 409 outputs the result of the interpolation ON (characteristic determination result information instructing to perform the interpolation processing) together with the image data of the respective colors.

Also in a step S209, if the result of the step S207 is interpolation OFF, the interpolation determination unit 409 outputs the result of the interpolation OFF (characteristic determination result information instructing not to perform the interpolation processing), together with the image data of the respective colors.

Note that, while the characteristic determination result information output from the screen image precise determination processing unit 1002C has been described as information indicating whether or not the watched pixel is a pixel in a screen image, the present embodiment is not limited to this configuration. For example, the screen image precise determination processing unit 1002C determines whether or not the watched pixel is a pixel in a screen image, and then, may output either the interpolation ON pattern matching information or the interpolation OFF pattern matching information to the determination result storing unit 1007 as the characteristic determination result information A according to the determination result. Note that obviously this method may be applied to the image edge precise determination processing unit 1003C.

Second Embodiment

Next, a second embodiment will be described.
<Interpolation Determination Unit>
In the first embodiment, the determination result storing units 1005 and 1006 receive only the input of the determination result for the cyan image data processed in the preceding processing. In the present embodiment, however, the determination results for the following image data for magenta (second color) and yellow (third color) can also be written additionally.

The present embodiment will be described in detail with reference to the drawings hereinafter.

Figure 13A:
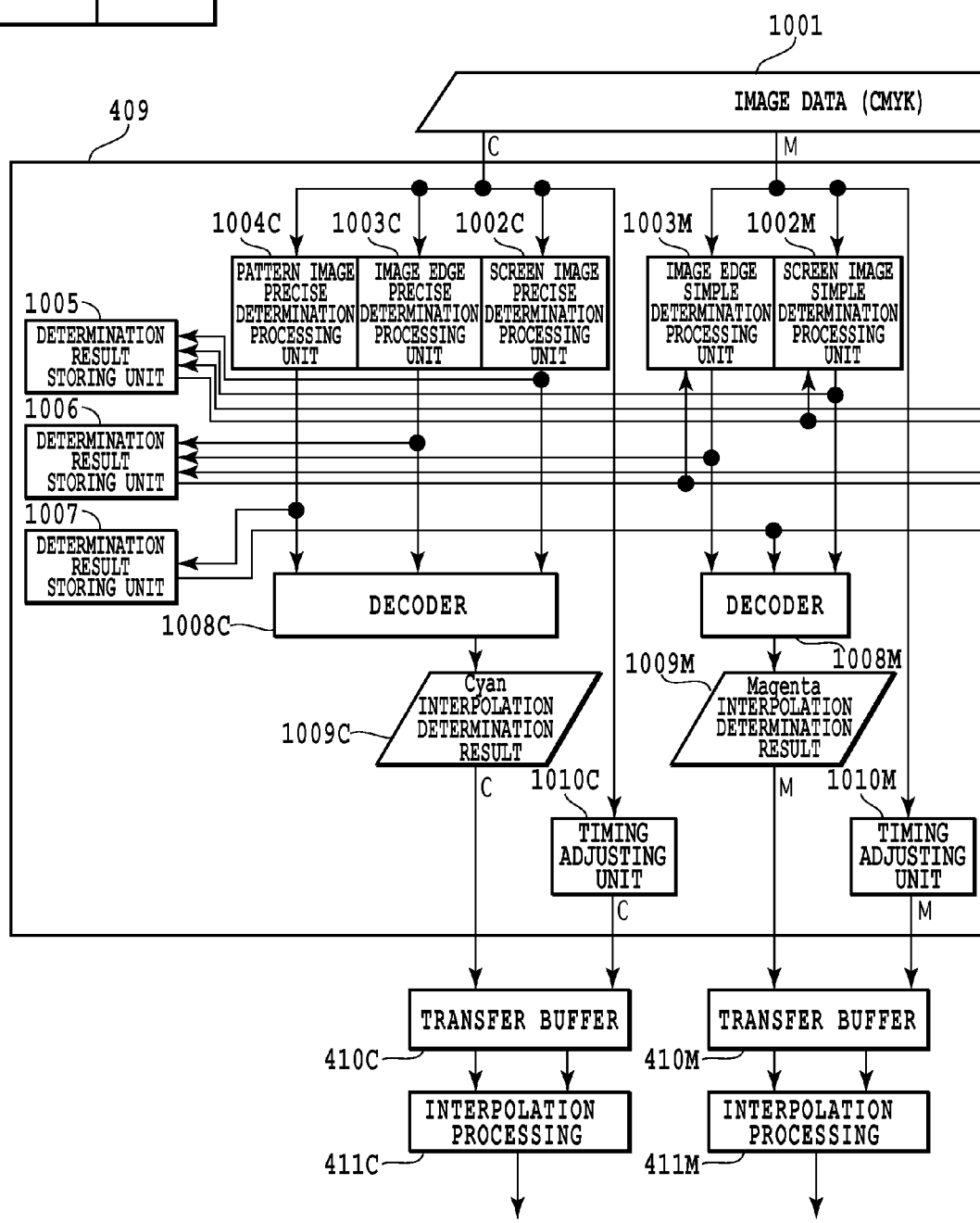
FIGS. 13A and 13B are a diagram showing a detailed configuration of an interpolation determination unit according to an embodiment of the present invention.
Figure 13B:
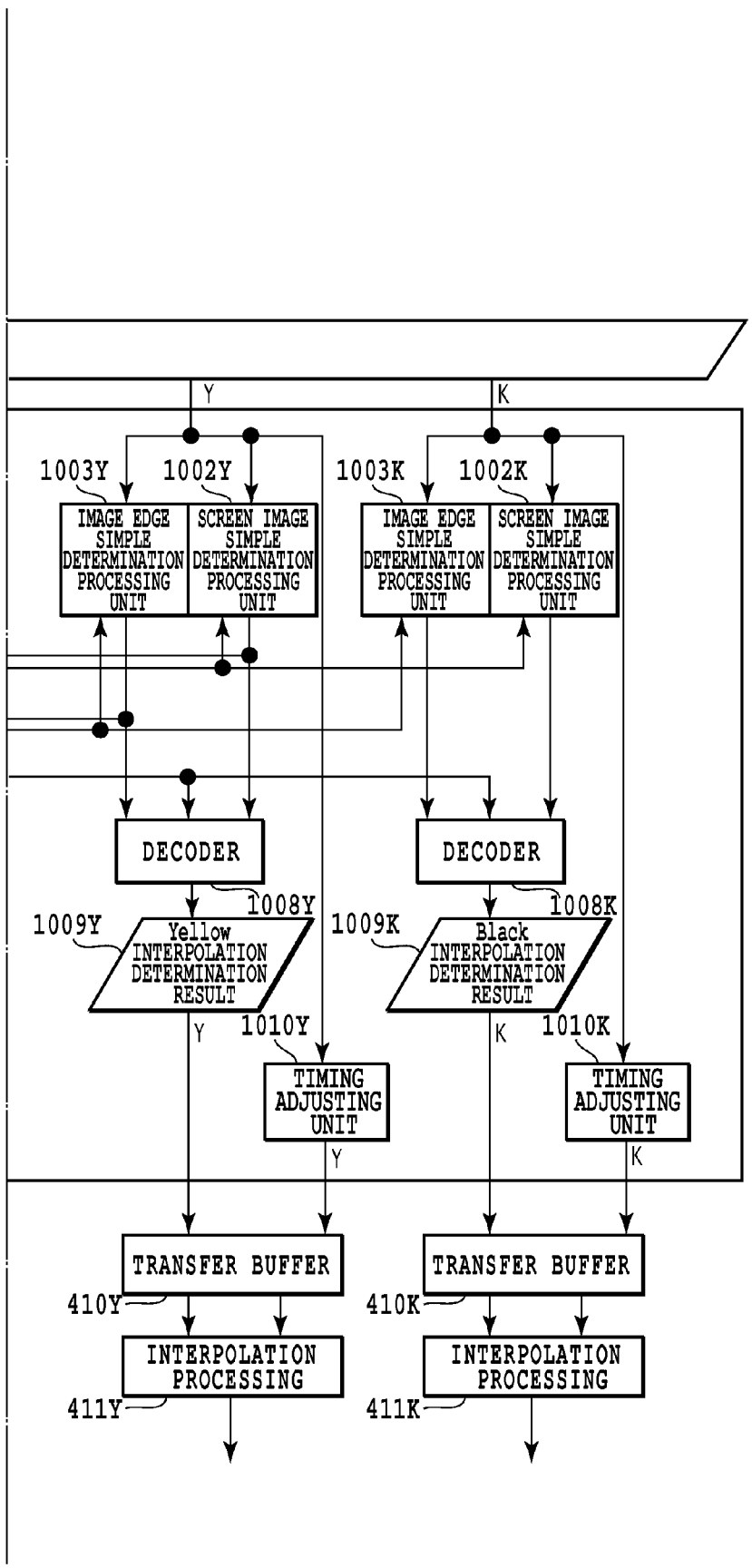

FIG. 13 shows a detailed configuration of the interpolation determination unit 409 according to the present embodiment. The difference from the first embodiment is in the configurations of the determination result storing unit 1005 and the determination result storing unit 1006.

In the present embodiment, the determination result storing unit 1005 has a configuration capable of storing not only the screen image determination result (characteristic determination result information) for cyan but also the characteristic determination result for magenta and yellow. This storage area may be held individually for each color or may have a configuration in which an old determination result is overwritten by a determination result for a color sequentially processed. By this configuration, it is additionally possible to store and retain the output data from the screen image simple determination processing unit 1002M (characteristic determination result information A') which is obtained from the magenta image data by adding the determination result for cyan.

Also, the determination result storing unit 1006 has a configuration capable of storing not only the image edge determination result for cyan but also the determination results for magenta and yellow.

By this configuration, it is possible to perform an accurate image determination combined with error determination correction.

<Interpolation Determination Process Flow>
FIG. 14 is an example of a flowchart showing the processing within the interpolation determination processing unit 409 according to the present embodiment. This flowchart show processes from a step of receiving the image data CMYK-asynchronously in the interpolation determination processing unit 409 to a step of outputting the image data together with the interpolation determination result for each color. A process flowchart for magenta (second color) and yellow (third color) is shown as a different point from the first embodiment. A process flowchart for cyan (first color) is the same as that shown in FIG. 11. Also, a process flowchart for black (fourth color) is the same as that shown in FIG. 12.

Steps S301 to S309 perform the same processing as the steps S201 to S209 in FIG. 12. Changed points are added steps S310 and S311.

In the step S310, the image edge simple determination processing units 1003M and 1003Y perform processing to write the image edge simple determination results obtained in a step S303 into the determination result storing unit 1006 as the characteristic determination result information B' (second information) before the results are utilized for the interpolation determination. By such write processing, it becomes possible further to refer to the preceding processing results with a better accuracy in the image determination for a color processed in the following processing.

In the step S311, the screen image simple determination processing units 1002M and 1002Y perform processing to write the screen image simple determination results obtained in a step S305 into a determination result storing unit 1005 as the characteristic determination result information A' (second information) before the results are utilized for the interpolation determination. By such write processing, it is further possible to refer to the preceding processing results with a better accuracy in the image determination for a color processed in the following processing, similarly to the step S310.

Other Embodiments of the Present Invention

A processing method, to store a program which operates the foregoing configurations of the embodiments to achieve the foregoing functions of the embodiments in a storage medium, to read the program stored in the storage medium as a code, and to cause a computer to execute the code, also falls within the scope of the foregoing embodiments. Further, not only the above described storage medium storing the computer program but also the program itself is also included in the foregoing embodiments.

Such storage media include a floppy disk (registered trademark), hard disk, optical disk, magneto-optical disk, CD-ROM, magnetic tape, non-volatile memory card, and ROM, for example.

Other than a method to execute processing by a single program stored in the above described storage medium, a method to operate on an OS in conjunction with other software or a function of an extension board for executing the operation of the foregoing embodiments also falls within the scope of the foregoing embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-199490, filed Jul. 31, 2007, which is hereby incorporated by reference herein in its entirety.

What is claimed is:

1. An image forming apparatus comprising:
a first determination unit configured to determine, for image data of one color in image data of a plurality of colors, a characteristic of each pixel of the image data of the one color;
a storage unit configured to store in a storing portion a determination result by the first determination unit;
a second determination unit configured to determine, using the determination result stored in the storing portion, a characteristic of each pixel of image data of a color other than the one color in the image data of the plurality of colors; and
a third determination unit configured to determine, based on a determination result by the second determination unit, whether or not to perform registration shift correction processing for each pixel of the image data of the color other than the one color.

2. The image forming apparatus according to claim 1, further comprising a correction unit configured to perform registration shift correction processing for a pixel which is determined to perform registration shift correction processing by the third determination unit.

3. The image forming apparatus according to claim 1, further comprising a fourth determination unit configured to determine, based on a determination result by the first determination unit, whether or not to perform registration shift correction processing for each pixel of the image data of the one color.

4. The image forming apparatus according to claim 1, further comprising a writing unit configured to write a determination result by the second determination unit into the determination result stored in the storing portion.

5. The image forming apparatus according to claim 1, wherein the registration shift correction processing is processing to correct shift in a sub-scan direction on the image data of the plurality of colors.

6. The image forming apparatus according to claim 1, wherein the characteristic is a screen image, an edge portion or a pattern image.

7. An image forming method performed in an image forming apparatus, comprising:
a first determination step of determining, for image data of one color in image data of a plurality of colors, a characteristic of each pixel of the image data of the one color;
a storage step of storing in a storing portion a determination result in the first determination step;
a second determination step of determining, using the determination result stored in the storing portion, a characteristic of each pixel of image data of a color other than the one color in the image data of the plurality of colors; and
a third determination step of determining, based on a determination result in the second determination step, whether or not to perform registration shift correction processing for each pixel of the image data of the color other than the one color.

8. A computer-executable program storable in a computer-readable recording medium for performing a method in an image forming apparatus, the method comprising:
a first determination step of determining, for image data of one color in image data of a plurality of colors, a characteristic of each pixel of the image data of the one color;
a storage step of storing in a storing portion a determination result in the first determination step;
a second determination step of determining, using the determination result stored in the storing portion, a characteristic of each pixel of image data of a color other than the one color in the image data of the plurality of colors; and
a third determination step of determining, based on a determination result in the second determination step, whether or not to perform registration shift correction processing for each pixel of the image data of the color other than the one color.

* * * * *